United States Patent
Pearson et al.

(10) Patent No.: US 9,916,369 B2
(45) Date of Patent: Mar. 13, 2018

(54) SYSTEM FOR CALCULATING A SOCIAL GRAPH USING A SUGI

(75) Inventors: Larry Pearson, San Antonio, TX (US); Steven Belz, Cedar Park, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 2184 days.

(21) Appl. No.: 12/725,992

(22) Filed: Mar. 17, 2010

(65) Prior Publication Data

US 2017/0199920 A1   Jul. 13, 2017

(51) Int. Cl.
G06F 17/30 (2006.01)
H04L 29/08 (2006.01)

(52) U.S. Cl.
CPC .. *G06F 17/30569* (2013.01); *G06F 17/30592* (2013.01); *G06F 17/30958* (2013.01); *H04L 67/02* (2013.01); *H04L 67/306* (2013.01)

(58) Field of Classification Search
None
See application file for complete search history.

(56) References Cited

U.S. PATENT DOCUMENTS

| | | |
|---|---|---|
| 7,424,541 B2 | 9/2008 | Bourne |
| 7,545,784 B2 | 6/2009 | Mgrdechian et al. |
| 7,593,740 B2 | 9/2009 | Crowley et al. |
| 7,628,704 B1 | 12/2009 | Uhlir et al. |
| 7,669,123 B2 | 2/2010 | Zuckerberg et al. |
| 8,954,500 B2 * | 2/2015 | Marlow ................. G06Q 10/10 705/319 |
| 2007/0250585 A1 | 10/2007 | Ly et al. |
| 2009/0070684 A1 | 3/2009 | Aldrich et al. |
| 2009/0171964 A1 | 7/2009 | Eberstadt et al. |
| 2009/0172783 A1 | 7/2009 | Eberstadt |
| 2009/0177744 A1 | 7/2009 | Marlow et al. |
| 2009/0249244 A1 | 10/2009 | Robinson et al. |
| 2009/0282002 A1 | 11/2009 | Reeder et al. |
| 2010/0027778 A1 | 2/2010 | Kumar et al. |
| 2010/0036912 A1 | 2/2010 | Rao |
| 2010/0042680 A1 | 2/2010 | Czyzewicz et al. |
| 2010/0049815 A1 | 2/2010 | Vanecek et al. |
| 2010/0050090 A1 | 2/2010 | Leebow |

(Continued)

OTHER PUBLICATIONS

Miller McPherson et al., Birds of a Feather: Homophily in Social Networks, Annu. Rev. Sociol. 2001, 27: 415-44.

(Continued)

*Primary Examiner* — Anh Tai Tran
(74) *Attorney, Agent, or Firm* — Hoffmann & Baron, LLP

(57) ABSTRACT

The present invention includes a method, system, and computer-readable medium for calculating a social graph using a social utility grid interface. The method includes the following steps. First, collecting one or more types of communication data. Next, inputting the one or more types of communication data into a social utility grid infrastructure. The social utility grid infrastructure analyzes the input data to determine a multi-dimensional first-order social graph by: (1) normalizing each of the one or more types of communication data; (2) representing the each of the one or more types of communication data as a vector; (3) calculating a Euclidean Norm; and (4) generating the multi-dimensional first-order social graph. Then, providing the multi-dimensional first-order social graph to one or more software applications.

20 Claims, 17 Drawing Sheets

(56) References Cited

U.S. PATENT DOCUMENTS

| | | |
|---|---|---|
| 2010/0057743 A1 | 3/2010 | Pierce |
| 2010/0058196 A1 | 3/2010 | Krishnan et al. |
| 2010/0063873 A1 | 3/2010 | McGucken |
| 2010/0063993 A1 | 3/2010 | Higgins et al. |
| 2010/0064006 A1 | 3/2010 | Chaintreau et al. |
| 2011/0213785 A1* | 9/2011 | Kristiansson .......... G06Q 10/10 707/748 |

OTHER PUBLICATIONS

Andreas Harrer et al, Combining Social Network Analysis with Semantic Relations to Support the Evolution of a Scientific Community, 2007.
Ronald S. Burt, Decay functions, Social Networks 22: 1-28 (2000).
Nathan Eagle, The Reality Mining Data, http://reality.media.mit.edu, last visited Feb. 12, 2010.
Nathan Eagle, et al., "Inferring Social Network Structure using Mobile Phone Data", Proceedings of the National Academy of Sciences (PNAS), 2009, vol. 106 (36), pp. 15274-15278.
Press W. H. et al, Numerical Recipes in FORTRAN—The Art of Scientific Computing, 2d Ed. (1992), Cambridge University Press, New York, pp. 675-694.
Robert B. Hayes et al., An assessment of the Levenberg-Marquardt fitting algorithm on saturating exponential data sets, Ancient TL, vol. 16, No. 2 (1998).
Levenberg-Marquardt Algorithm, http://en.wikipedia.org/wiki/Levenberg—Marquardt_algorithm, last visited Feb. 12, 2010.
Larry B. Pearson et al., "Social Utility Grid", U.S. Appl. No. 12/533,523.

* cited by examiner

SYSTEM FOR CALCULATING A SOCIAL GRAPH USING A SUGI

COPYRIGHT NOTICE

A portion of the disclosure of this document contains material that is subject to copyright protection. The copyright owner has no objection to the facsimile reproduction of the patent disclosure, as it appears in the U.S. Patent and Trademark Office patent files or records, but otherwise reserves all copyright rights whatsoever.

BACKGROUND

Field

The present application relates generally to the field of social networks. More specifically, the disclosure provided herein relates to calculating closeness values to represent social relationship based on multiple types of communication data and graphically displaying the data in a multi-dimensional social graph.

Brief Description of the Related Art

Social networking websites, such as Facebook®, LinkedIn®, and MySpace®, enable users to identify, connect with, and communicate with friends. For example, at the outset, a first user and a second user may not be connected within a social network. The first user may connect with the second user by transmitting a friend invitation to the second user. The second user may accept or deny the friend invitation. If the second user denies the friend invitation, then the first user and the second user may remain unconnected within the social network. If the second user accepts the friend invitation, then the first user and the second user may be connected within the social network.

A given social network may include any number of users. In conventional social networking websites, the relationship between any two users in the social network is a binary representation. For example, the binary representation may indicate that two users are either friends or non-friends. In some implementations, certain permissions may be granted based on the binary relationship. For example, when the first user and the second user are not connected, the second user may be restricted from viewing the first user's profile. At a later time when the first user and the second user connect, the second user may be allowed to view the first user's profile.

Although social networking websites traditionally simplify relationships as a binary representation, real-life relationships have much greater variability. For example, a given individual may divide real-life relationships between co-workers, close friends, family members, and numerous others. However, many current implementations of social networks do not support richer representations of relationships beyond the traditional binary relationship.

SUMMARY

The present application describes a method for calculating a social graph using a social utility grid interface. The method includes the following steps. First, collecting one or more types of communication data. Next, inputting the one or more types of communication data into a social utility grid infrastructure. The social utility grid infrastructure analyzes the input data to determine a multi-dimensional first-order social graph by: (1) normalizing each of the one or more types of communication data by calculating a closeness value for the each of the one or more types of communication data for a particular ego and alter ego pair, the closeness value is based on a normalization factor assigned to the each of the one or more types of communication data, a relationship decay function, temporal information, and an importance factor; (2) representing the each of the one or more types of communication data as a vector in a multi-dimensional vector from the ego to the alter ego in the particular ego and alter ego pair using the closeness value of the each of the one or more types of communication data; (3) calculating a Euclidean Norm using the closeness values for the each of the one or more types of communication data, where the Euclidean Norm provides a scalar representation of the closeness for each of the one or more types of communication data; and (4) generating the multi-dimensional first-order social graph. Then, providing the multi-dimensional first-order social graph to one or more software applications.

The present disclosure further describes a system for calculating social relationships and generating a social graph. The system includes: a social utility grid collector, a social utility grid infrastructure, a social utility grid application, and a server. The social utility grid collector configured to gather one or more types of communication data. The social utility grid infrastructure being configured to analyze the one or more types of communication data. The social utility grid application being configured to provide a user interface capable of accepting user input and displaying the social graph. The server being a three-tiered web application configured to operatively connect the social utility grid infrastructure to the social utility grid application. The system generates a multi-dimensional first-order social graph by: collecting one or more types of communication data using the social utility grid collector and inputting the one or more types of communication data into the social utility grid infrastructure. The social utility grid infrastructure analyzes the input data to determine the multi-dimensional first-order social graph by: normalizing each of the one or more types of communication data by calculating a closeness value for the each of the one or more types of communication data for a particular ego and alter ego pair, the closeness value based on a normalization factor assigned to the each of the one or more types of communication data, a relationship decay function, temporal information, and an importance factor; using the closeness value of the each of the one or more types of communication data to represent the each of the one or more types of communication data as a vector in a multi-dimensional vector from the ego to the alter ego in the particular ego and alter ego pair; calculating a Euclidean Norm using the closeness values for the each of the one or more types of communication data, where the Euclidean Norm provides a scalar representation of the closeness for each of the one or more types of communication data; and generating the multi-dimensional first-order social graph. The system then provides the multi-dimensional first-order social graph to the social utility grid application via the server, wherein the social utility grid application displays one or more elements of the multi-dimensional first-order social graph on the user interface.

The present application yet further describes a computer-readable medium including instructions, that when executed by at least one computing device cause the computing device to calculate social relationships and generate a social graph. The instructions include collecting one or more types of communication data. The collected one or more types of communication data is inputted into a social utility grid infrastructure. The social utility grid infrastructure analyzes the input data to determine a multi-dimensional first-order social graph as follows. Normalizing each of the one or more types of communication data by calculating a closeness value for the each of the one or more types of communication data for a particular ego and alter ego pair. The closeness value based on a normalization factor assigned to the each of the one or more types of communication data, a relationship decay function, temporal information, and an importance factor. Representing the each of the one or more types of communication data as a vector in a multi-dimensional vector from the ego to the alter ego in the particular ego and alter ego pair using the closeness value of the each of the one or more types of communication data. Calculating a Euclidean Norm using the closeness values for the each of the one or more types of communication data. The Euclidean Norm provides a scalar representation of the closeness for each of the one or more types of communication data. Generating the multi-dimensional first-order social graph. Then, the instructions include providing the multi-dimensional first-order social graph to one or more software applications.

Other objects and features of the present application will become apparent from the following detailed description considered in conjunction with the accompanying drawings. It is to be understood, however, that the drawings are designed as an illustration only and not as a definition of the limits of the application.

Figure 1:
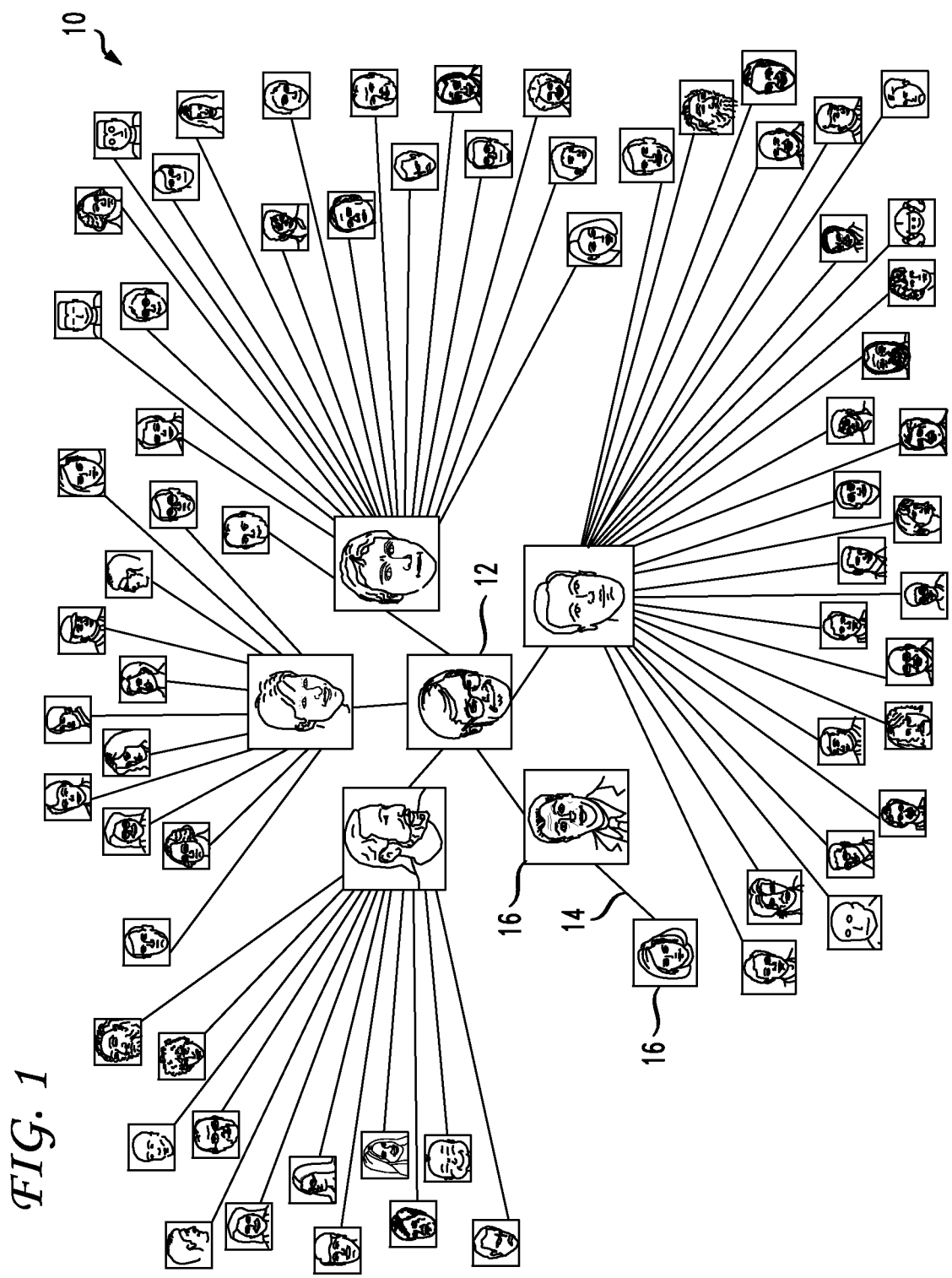
FIG. 1 shows a graph of nodes and ties emulating from an actor.

Specific examples of Raw data and computer code used for Apple's® iPhone® and iTunes® and AT&T's® FamilyMap™ software applications are incorporated in this document as Appendices A and B.

DETAILED DESCRIPTION

A Social Utility Grid Infrastructure (SUGI) is described herein. The SUGI is a social infrastructure engine based on network analysis. The SUGI generates a social graph that describes the social ties between individuals in a richer manner than the simple on/off "Are you my friend?" approach of explicit social networking sites, such as, Facebook®, LinkedIn® and MySpace®. Additionally, the SUGI generates the graph automatically, based on inputs retrieved from the users' communication activity. The SUGI is an implementation that restricts focus to a very specific collection of communication event data, such as, recording calls, messages and contacts from a Smartphone, i.e., an iPhone®, Android™, Windows® Mobile, Palm® or BlackBerry®.

The SUGI automatically deduces information about user social relationships, based on records of their social activities. The resulting social graph is then available as a valuable source of data for a wide variety of other applications. The SUGI provided two key differentiators that set the SUGI apart from other social networking software. First, the social network is automatically deduced from communication events, rather than by explicitly asking the user to identify their friends. Second, the ties between individuals in the social network are described in a much richer, multi-dimensional way than existing social networking applications, which tend to restrict ties to a single bit of information, such as, is this individual a friend, yes or no?

Examples of one or more types of communication data collected and analyzed include: call data (who/when/how long); SMS/MMS message data (who/when/how big); address book entries; and location events deduced from photograph metadata. Information regarding the location of events is optionally extended by retrieving user location data from a location based service (LBS), such as, the AT&T® FamilyMap™ service.

Additionally, the SUGI may use location data to identify proximity between different users, and to use this as an input to the social graph generation process. In other words, if two individuals are often physically close to each other, there is an increased chance that they are friends. However, the use of location data involves some difficult practical issues, including the trade-offs against battery-life (for device-based location determination) or code (for network-based location determination).

The following are some fundamental concepts that underpin social network analysis, including some key pieces of terminology used herein. A social network involves social relationships between individuals and organizations. This involves nodes and ties.

Each node is an individual actor in the network. It may be a person, a family, a group, an organization or even a country. Furthermore, each tie is a relationship between actors. This relationship can be of a vast range of different types, such as, values, visions, ideas, commerce, friends, kinship, dislikes, conflict, web links, hobbies, activities, culture, religion, and transportation routes.

Ties are not symmetrical. A tie may be one way, the other way, or two-way (reciprocal). Ties may connect together different types of node. Together, nodes and ties give a wide range of possibilities, such as:

person$_1$→person$_2$, person$_1$ ↔ person$_2$, person$_1$←person$_2$
person$_1$→group$_2$, person$_1$ ↔ group$_2$, person$_1$←group$_2$
group$_1$→group$_2$, group$_1$ ↔ group$_2$, group$_1$←group$_2$
person$_1$→organization$_2$, person$_1$ ↔ oganization$_2$, person$_1$←organization
group$_1$→organization$_2$, group$_1$ ↔ organization$_2$, group$_1$←organization$_2$
organization$_1$→organization$_2$, organization$_1$ ↔ organization$_2$, organization$_1$←organization$_2$ Moreover, ties do not always imply friendship; they can be of different types: kinship, friendship, love, exchange, co-authorship, co-membership, talking with, hate, trust, and fighting. The social role that each actor plays in the relationship affects how the tie is expressed. A father⟷son relationship involves different expectations and behaviors than a salesman⟷customer relationship. Stronger ties mean closer relationships—and a smaller number for the closeness, as if it were a distance.

Taken together, all of the nodes and the ties between actors form a social network, which is known mathematically as a graph. The graph may be multi-dimensional to better capture the complexity of human relationships. A graph 10 of the ties 14 emulating from one particular actor 12 are shown as FIG. 1. Social network analysis often starts by analyzing the ties 14 that emanate from one particular actor 12 and attaching the one particular actor 12 to one or more nodes 16. There are two vital pieces of terminology that are used to make it clear which actors 12 are being discussed. The ego is the particular actor 12 who is the center of the social graph 10, and whose interactions are being studied. The alters are all of the other actors or nodes 16 that the ego 12 interacts with.

For the node 16 to appear in the social graph 10, there has to be some method of determining the identity of the node 16. For individuals, this does not present a problem in the real world. Even if a friend changes their name and all of their addresses, phone numbers and email addresses, they will still be recognizable to their friends. However, in the realm of data that is accessible to a system, like SUGI, determining identity in a stable, reliable way is expected to cause potential difficulties. Even in the real world, things are not straightforward when the actor in a social network is not an individual, but is instead a grouping of some sort, such as, an organization, a group, a family, or a nation.

For example, when members of a rock group split up and form new groups, what does that mean for the identity of the original group? If a large monopolistic corporation is forcibly split into seven regional holding companies, but four of those later remerge into a single corporation, what happens to the identity of the original organization Social network sites like Facebook® and LinkedIn® represent ties 14 (relationships) as scalars (or real numbers). Sites like Facebook® and LinkedIn® only provide 0 (false or not a friend) or 1 (true or is a friend) as the possible tie 14 (relationship) values. However, scalars include whole numbers and fractions or decimals, such as ½ or 3.14159 or π. The present invention creates an N-dimensional social graph 10 using more than just whole numbers.

The SUGI represents the ties 14 (relationships) as vectors. A vector is a tuple, i.e., an ordered list of scalars where each element in the list represents a dimension like (3, 4) or (1, 3, 2, 15, 18, 0, 21). The magnitude (length) of a vector is the square-root of the sum of the squares, for example the magnitude or length of the vector (3, 4) is 5, as in a 3, 4, 5 right triangle. The vector's dimensions (x1, x2, x3, . . . , xn) can be one or more of the following (1) a communication mode (telephone, mobile, text, email, IM, etc), (2) a proximity frequency or duration (physical or virtual), (3) ego 12 (self) role, alter 16 (other) role, or ego 12 role to alter 16 role pair (mother, daughter, mother-daughter, caterer, attendee, organizer, president, vice-president, secretary), (4) an event (tea party, rock concert, little league game, camping trip, PTA meeting), (5) an external social graph (friends on Facebook®, LinkedIn®, MySpace®), (6) group (Parent Association, XYZ University, St. Henry Parish, Landscape Forum, BC Farms Home Owners Association), and (7) combinations of the above.

The SUGI may perform automatic social graph 10 generation using data inputs that may include observable behaviors, call logs, SMS/MMS logs, voicemail logs, address book contacts, emails, instant messages, location/proximity (LBS, photos, calendaring, etc.), and transactions (web, credit card, debit card, etc.). The invention may further generate a social graph 10 using location/proximity, email, IM, photos, calendar/events, transactions, web behaviors, and other observable social behaviors as will be appreciated by one skilled in the art. The social graph 10 may also be influenced by other factors, such as, supervisory override, relationship decay function, end-user tuning, role/persona determination, and context determination.

Calculating relationships for use in the social graph 10 creates some challenges due to measurement methods, which may be difficult to actually calculate relationships using logic and mathematical functions due to different measurement data, human nature, and the fact that relationships continually change. For example, different measurement date includes different numbers and types of occurrences, such as, duration (phone calls, voicemail, calendaring), size (texting, IM, email), and location/interaction (proximity, contacts), which cannot be given the same weight and are not directly comparable. A solution provided with this invention is to Normalize data in a manner that allows different measures to be compared, i.e., to compare one measure (calls) to another (text messages), in such a manner that the relationship can accurately be shown on the social graph 10.

For example, suppose Ny is a "Normalization Factor", where initial values are calculated from public data. Then, an iterative method tests subjects periodically to view an existing ordered list of their "friends" and reorder the list of "friends" as necessary. The reordered list may then be used as input to calculate a new set of normalization factors, which will be used in the next calculation. The normalization factor may answer important questions; however, a single set of normalization factors may not apply to the entire population of users. Other factors, such as, demographics, may also be necessary to drive normalization factors.

An additional reason that measurements may be different and not comparable is due to the individual characteristics that effects human habits and feelings, which result in each person viewing measurement occurrences and relationships differently, i.e., the amount and type of communication. For example, one person may view an SMS more meaningful than a phone call and vice versa. Furthermore, relationships are continually changing. Relationships are generally not symmetric, i.e., he likes her more than she likes him.

Moreover, relationships may decay over time, making the relevance of today's phone call different than the relevance of a phone call occurring a year ago. Few relationships are permanent, and without interaction relationships decay over time. Any analytical study of social networks needs to take this into account, by applying a suitable relationship decay function. A decay function gets smaller over time so as to describe the decay of the relationship. The amount of decay is a function of time, the strength of the tie, and the age of the actors involved. Therefore, a relationship decay function can be implemented in several different ways. For example, (1) a sliding window that only considers the most recent (say) 6 months of data; (2) a half-life approach, where older data becomes exponentially less relevant over time; (3) a gradual decay approximated by a power law, as described in Ronald S. Burt, Decay functions, Social Networks 22: 1-28 (2000); and/or (4) a more complicated approach, which takes other factors into account (age of actors, age of relationship, degree of kinship).

The SUGI may also create semantic networks, when for example, two actors 12 and 16 never communicate directly with each other, but the actors 12 and 16 have topics of shared interest then there may be an indirect link between them that influences the social network. See Andreas Harrer et al, Combining Social Network Analysis with Semantic Relations to Support the Evolution of a Scientific Community, 2007. Examples include: (1) If two actors are interested in the same topic, then they are more likely to have a stronger relationship; and (2) If the topic is more specialized, this effect is likely to be stronger than for a more widely popular topic. When multiple related topics are inter-related, forming a semantic network (or ontology), then two actors who are interested in related topics may have their relationship strengthened according to how closely related the topics are. See Andreas Harrer et al, Combining Social Network Analysis with Semantic Relations to Support the Evolution of a Scientific Community, 2007; Miller McPherson et al., Birds of a Feather: Homophily in Social Networks, Annu. Rev. Sociol. 2001, 27: 415-44.).

Figure 2:
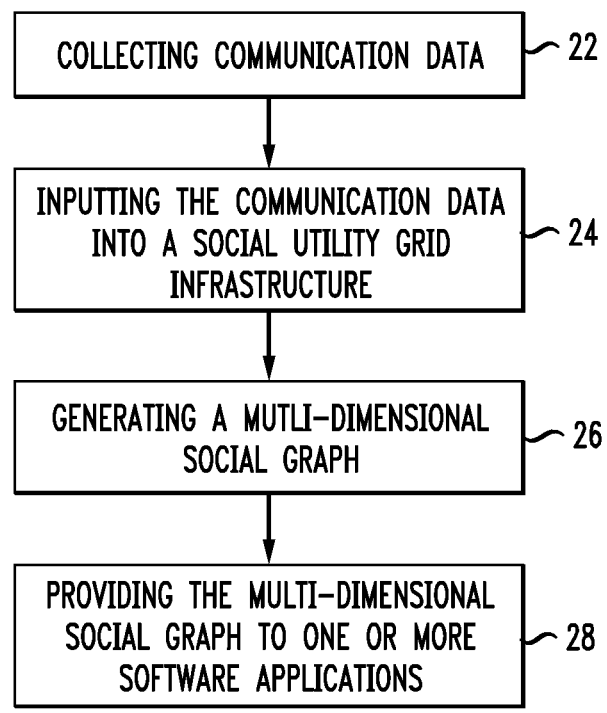
FIG. 2 depicts a method for calculating social relationships and generating a social graph.

FIG. 2 provides a method 20 for calculating social relationships and generating a social graph 10 comprising the following steps. First, step 22 provides for collecting one or more types of communication data. Next, inputting the one or more types of communication data into a social utility grid infrastructure as in step 24. The social utility grid infrastructure analyzes the input data to determine a multi-dimensional first-order social graph 10 by: (1) normalizing each of the one or more types of communication data by calculating a closeness value for the each of the one or more types of communication data for a particular ego 12 and alter ego (alter) 16 pair, the closeness value based on a normalization factor assigned to the each of the one or more types of communication data, a relationship decay function, temporal information, and an importance factor; (2) representing the each of the one or more types of communication data as a vector in a multi-dimensional vector from the ego 12 to the alter ego 16 in the particular ego 12 and alter ego 16 pair using the closeness value of the each of the one or more types of communication data; and (3) calculating a Euclidean Norm using the closeness values for the each of the one or more types of communication data, where the Euclidean Norm provides a scalar representation of the closeness for each of the one or more types of communication data. Then, step 26 provides for generating the multi-dimensional first-order social graph 10. Finally, the multi-dimensional first-order social graph 10 to one or more software applications is provided in step 28.

The one or more types of the communication data normalized may include one or more of the following selected from the group consisting of: call data, address book data, proximity data, topic data, calendar data, event data, transaction data, application data, social network site data, browsing history data, and email data. The closeness value may be calculated to include a relationship decay function, the relationship decay function is based on one or more of the following types of equations selected from the group consisting of a step equation, a piecewise linear equation, an exponential equation, a power equation, and a sigmoid equation. The multi-dimensional first-order social graph 10 may be provided to the one or more software applications based on user preferences, access constraints, and privacy policies.

The method 20 may further comprise one or more of the following: (1) displaying one or more elements of the multi-dimensional social graph 10 on a user interface; (2) accepting user entry of a desired closeness for the particular ego 12 and alter ego 16 pair; (3) providing a supervisory override function such that the input data for the particular ego 12 and alter ego 16 pair is ignored and a user is capable of explicitly marking a particular relationship with a designation irregardless of the closeness value; and (4) generating a multi-dimensional second-order social graph 10 based on the closeness of the particular ego 12 and alter ego 16 pair and all alter egos 16 of the ego's 12 alter ego 16.

SUGI System

Figure 3:
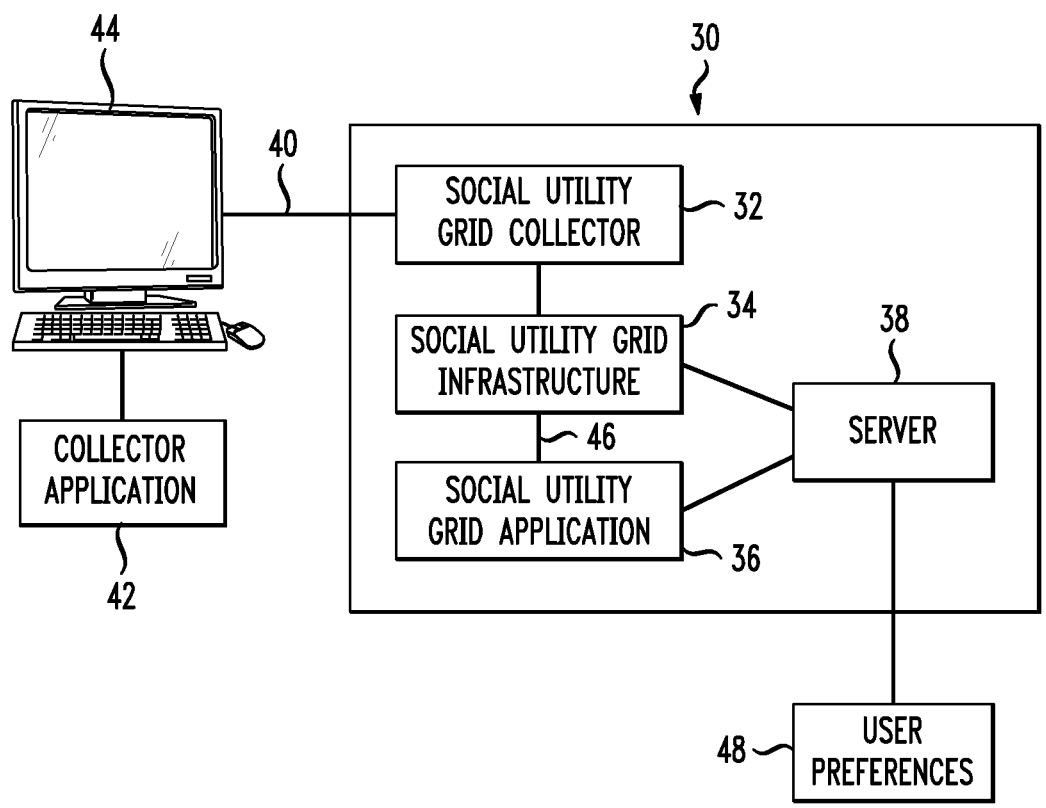
FIG. 3 depicts a system for calculating social relationships and generating a social graph.

As shown in FIG. 3, a system 30 for calculating social relationships and generating a social graph 10 is provided. The system 30 includes a social utility grid collector 32; a social utility grid infrastructure 34, a social utility grid application 36, and a server. The social utility grid collector 32 is configured to collect raw communication data 40 using a collector application 42 the runs on a electronic communication, such as a device 44, a Smartphone, a BlackBerry®, and iPhone®, a computing device, and/or any other electronic device capable of running an application and storing and/or transmitting data. The social utility grid infrastructure 34 is used to analyze the communication data 40 to enable generation of the social graph 10 using the social utility grid application 36 and the server 38.

The social graph 10 generation aspects for the calculation engine form the heart of the system. The social utility grid infrastructure 34 collates all of raw data 40 about the user's communication events to produce a multi-dimensional closeness vector for every other person that the user communicates with; each of the components of this vector corresponds to a particular type of communication (i.e., call frequency, call duration, SMS frequency, joint meetings). These multi-dimensional closeness vectors are combined into a single number to allow the user's social graph 10 to be sorted on display to the user. The initial calculation algorithms are not expected to produce perfect results; a key piece of functionality for the system is therefore to allow users' feedback about the accuracy or otherwise of their social graphs 10 to be fed back into the system 30 to improve the performance of the calculation. This process is implemented as a parameter fitting operation that automatically adjusts the parameters of the social utility grid infrastructure 34 to more closely match the user's feedback.

The social utility grid collector 32 may optionally retrieve information about the user's location. This functionality requires the user to register and periodically accesses the location service to retrieve location data (using web scraping techniques). The social utility grid collector 32 and social utility grid application 36 elements are modular, i.e., new instances of the social utility grid collector 32 and social utility grid application 36 may be added to the architecture without affecting the overall architecture of the system.

Social Utility Grid Collector

Figure 4:
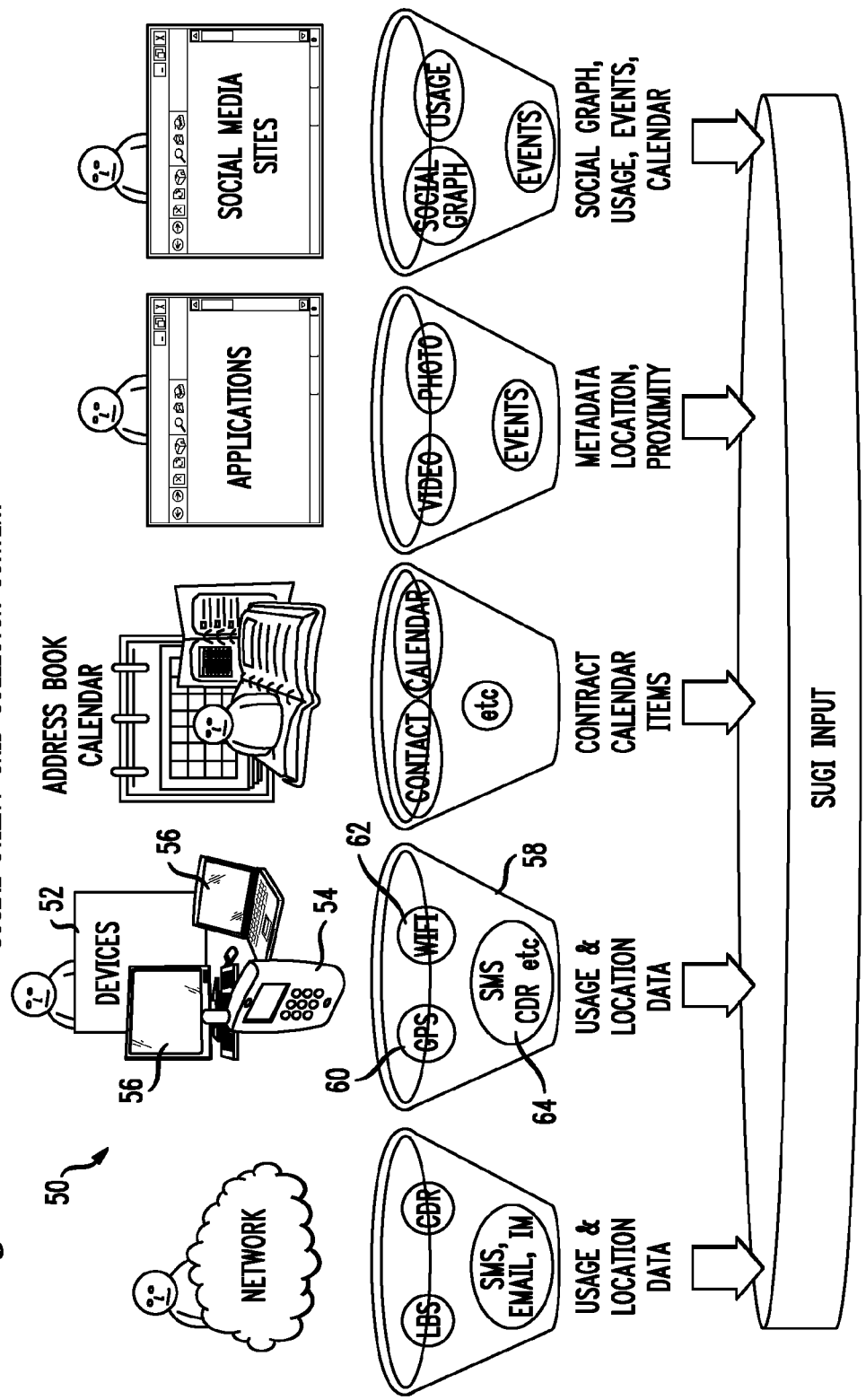
FIG. 4 provides examples of types of data collected by a social utility grid collector.

Specifically, the social utility grid collector 32 gathers raw usage data 40 about the communication events and other behavioral observations of subscribers, and uploads that data 40 to the server 58 for future analysis and use. As previously stated, the collectors 32 are modular, which enable new types of data 40 collection to be added to the system 30 without affecting existing functionality. FIG. 4 provides a chart 50 containing examples of various types of information that may be collected by the social utility grid collectors 32. For example, information may be obtained from electronic communication devices 52, such as a cellular phone 54, Smartphone, i.e., iPhone®; and personal computer 56, and the data collected 58 may be GPS locations 60, WIFI locations 62, and SMS/CDR messaging data 64.

Social Utility Grid Infrastructure

Figure 5:
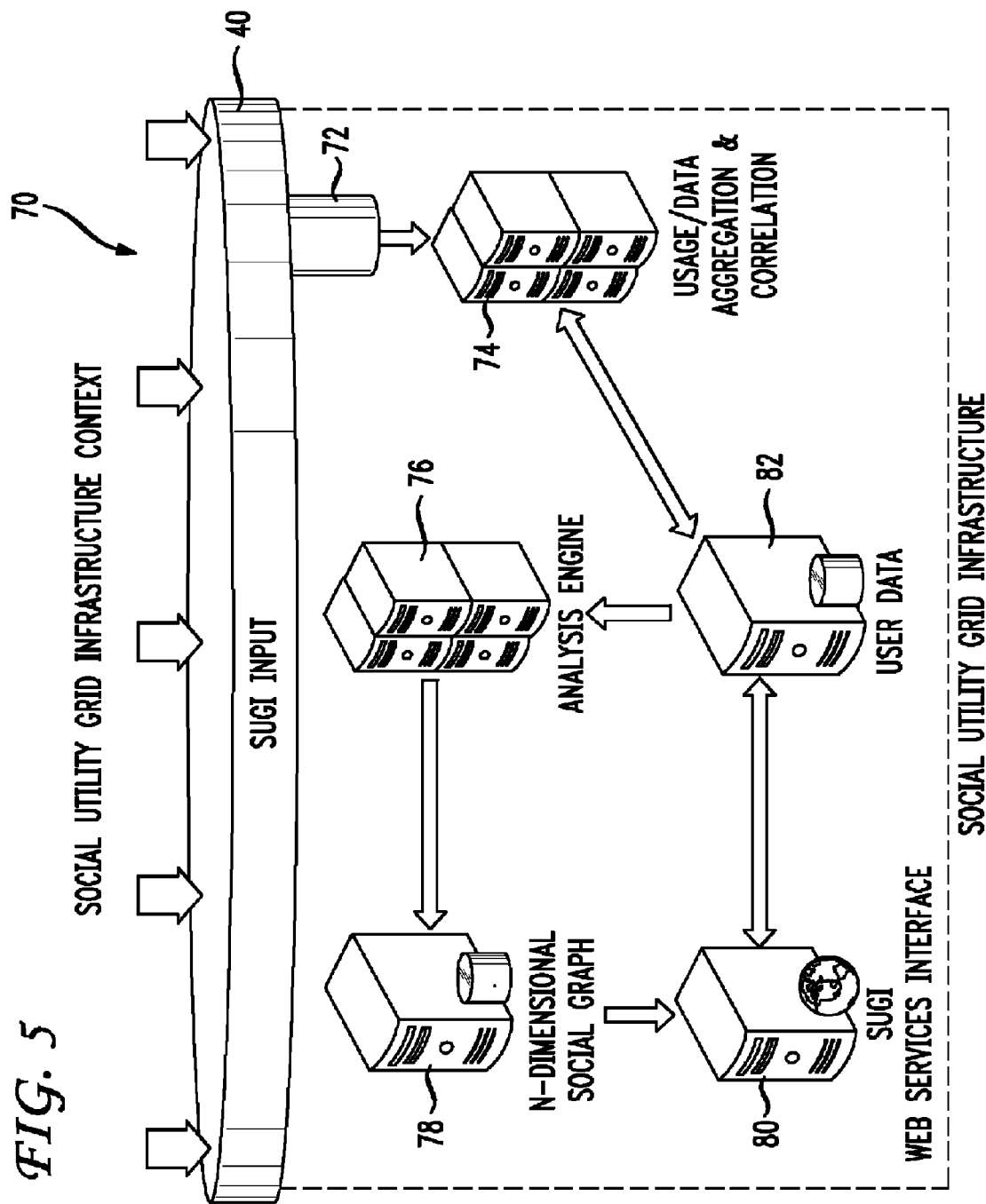
FIG. 5 shows an exemplary social utility grid infrastructure.

The social utility grid infrastructure 34 is the core of the system 30 and provides the calculation infrastructure. FIG. 5 provides an exemplary infrastructure 70. The social utility grid infrastructure (1) examines the raw usage data for users of the system 72; (2) collates the raw data 74 for each type of communication event to generate a single closeness number for that type of communication; (3) normalizes the closeness numbers 76 across different types of communication events (e.g., emails versus calls) so they are comparable; (4) combines these normalized closeness numbers to produce a multi-dimensional closeness vector 76; and (5) determines the overall size of this closeness vector to produce an overall closeness as a single number (a scalar closeness) 76. Since, the social graph 10 that results from these calculations 78 may not be perfect, the system allows subscribers to provide user preference data as feedback 80 such as through a web services interface, about how they think the graph should have looked. This user preference data is incorporated 82 and then used to tune the generation process 74, 76 so that future attempts to generate this user's social graph 10 are more accurate.

The data structures that form the social utility grid infrastructure 34 are fundamentally driven by the data 40 that is being processed; therefore, it is important to accurately describe the different types of data involved and the relationships between them. Examples of the types of data are shown in FIG. 4 and described below.

Social Utility Grid Application

Figure 6:
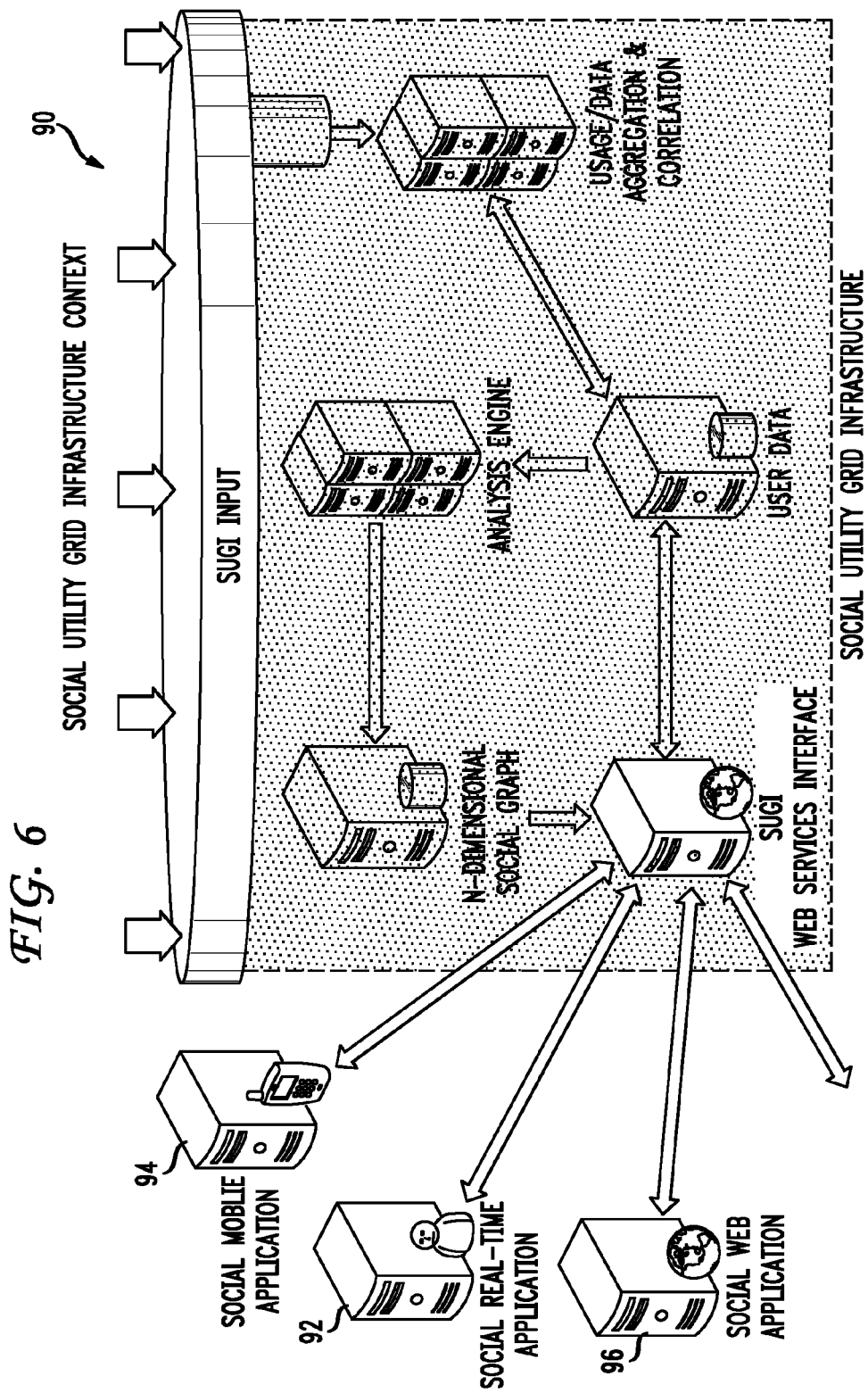
FIG. 6 shows an exemplary social utility grid application.

The social utility grid application 36 consumes the social graph data 46 produced by the infrastructure 34, and uses it to provide a useful service. FIG. 6 provides an example of the context 90 of the social utility applications 36. The types of social utility grid applications can be of different styles: (1) real-time applications 92 (for example, call control); (2) mobile applications 94 (for example, displaying friend proximity); and (3) web applications 96 (for example, integration with explicit social networking sites). As a special case, the mobile and web applications 94, 96 may include the main user interface for the system 30.

Server

The server 38 includes functionality to allow secured access to the underlying databases that form the heart of the SUGI system 30. This functionality takes the form of a normal database-backed web application.

The server 38 is operatively connected to the social utility grid infrastructure 34 containing an analysis engine for performing the collation and normalization of the raw communication data 40 in order to produce the multi-dimensional social graph 10. The analysis engine also includes parameter fitting functionality that processes explicit user preference data 48 in order to generate a more accurate set of parameters for the analysis algorithms.

The explicit preference data 48 may be used as input to a parameter fitting process that attempts to modify the set of parameters used as input to the run so as to better fit the user's preferences for ordering of their social graph 10. As for the run data described all of the information needed to exactly recreate this parameter fitting procedure is stored, including the date and time that the parameter fitting run was originally performed.

For the input data, the ego 12 and alter 16 pair whose distance is being fitted. Additionally, the row ID for the explicit preference data 48, which in turn indicates the raw data 40 set and parameter values included in the original calculations. The subversion revision identifier for the parameter fitting code that was used. For output data a new run ID, which includes the new set of parameter values that provide a better fit to the user's specific scalar distances. The results of these parameter fitting runs affect future runs for the same ego 12 and alter 16 pair, because the calculated parameter values are used for that combination henceforth.

If underlying raw data 40 is deleted, any parameter fitting run data that uses that raw data 40 may also be deleted.

The System in Operation

In operation the system may function as follows in exemplary scenarios. These scenarios are organized roughly in the order that the user would encounter them: registering for the service, installing the desktop application, uploading data, viewing the social graph 10, then providing feedback on the social graph 10. Alternatively, the data may be collected by instrumenting the network (e.g., deep packet inspection). However, the data is collected in the exemplary scenarios from the device or end-point due to the social issues that arise when the public thinks they are being spied on.

Prior to or after user registration, the user will need to download an application to instrument their phone. Typically that would be done after the registration. But if it is done before the registration, then the registration would occur when the user installs the application.

Figure 7:
FIG. 7 shows an exemplary registration page for a social utility grid service.

First, user registration. There are two possible variants for user registration, invitation-only and direct registration. For invitation only, an administrator for the site sends the user a URL. The user clicks on the URL and their browser lands on the registration page. The user's email address may be pre-filled in this scenario. In direct registration, the user accesses the site and clicks on the Register link. FIG. 7 provides an example of a registration page 100, which may be used in both scenarios. The registration page 100 requires the user to: (1) enter a telephone number 102, (2) enter their email address 104, (3) enter and confirm a password 106, 108, and (4) explicitly acknowledge that they have agreed to the user sign-up agreement 110.

The sign-up agreement 110 gives explicit permission to use the user's personal data, and warns that their data may be used in the calculation of other people's social graph 10.

If the entered information is acceptable (password copies match, number/email not already registered), then the user is redirected to a pending-activation page and is sent an activation email.

When the user clicks on the link in the activation email, this confirms that they own that email address and they are directed to a confirmation page. The user's telephone number may not be verified at this stage because the social utility grid collector application 32 may be configured to perform verification of the telephone number, i.e., when a Smartphone, such as the iPhone® is used with the system.

Figure 8:
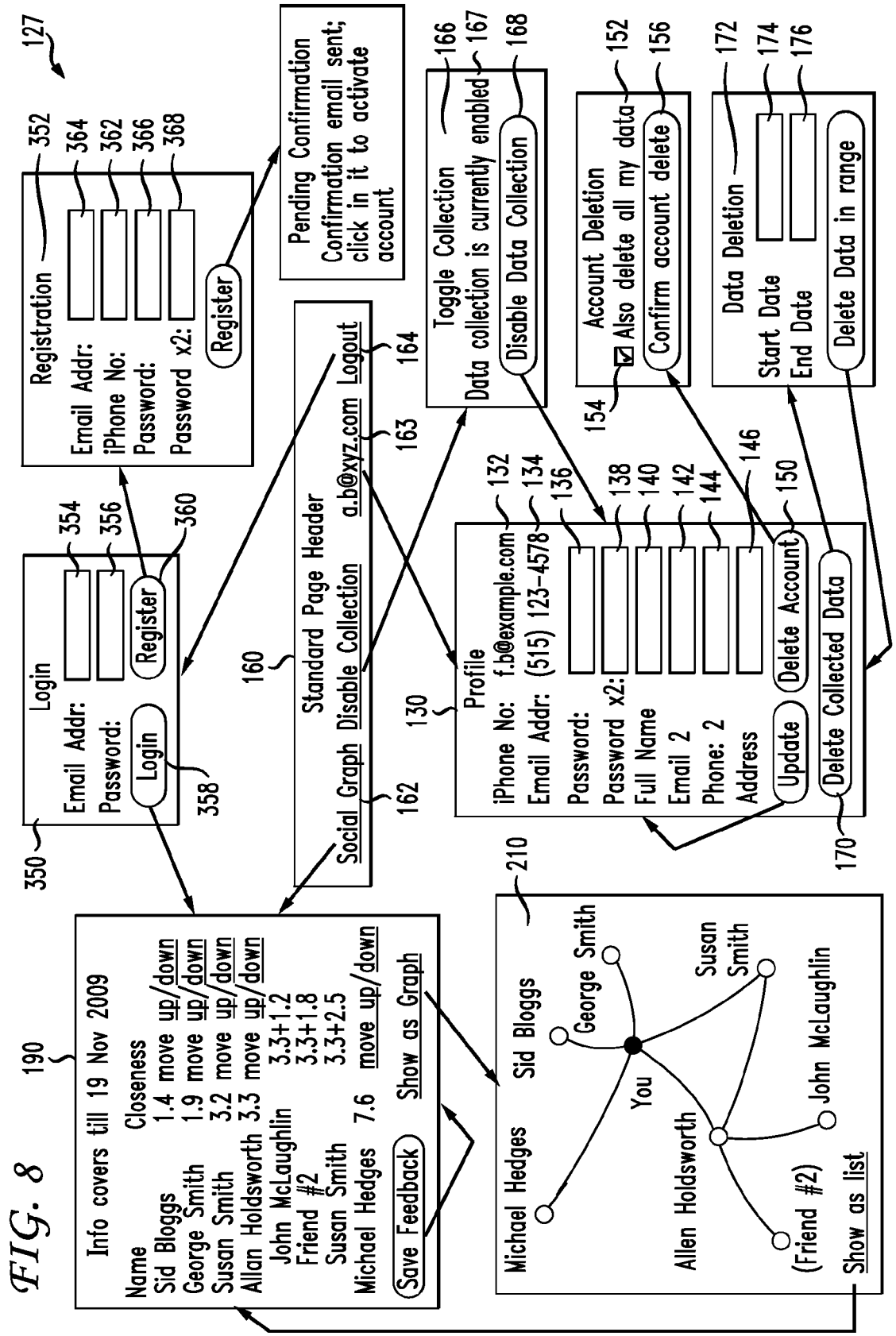
FIG. 8 shows an exemplary flow chart of web pages for use with the social utility grid application of FIG. 6.
Figure 9:
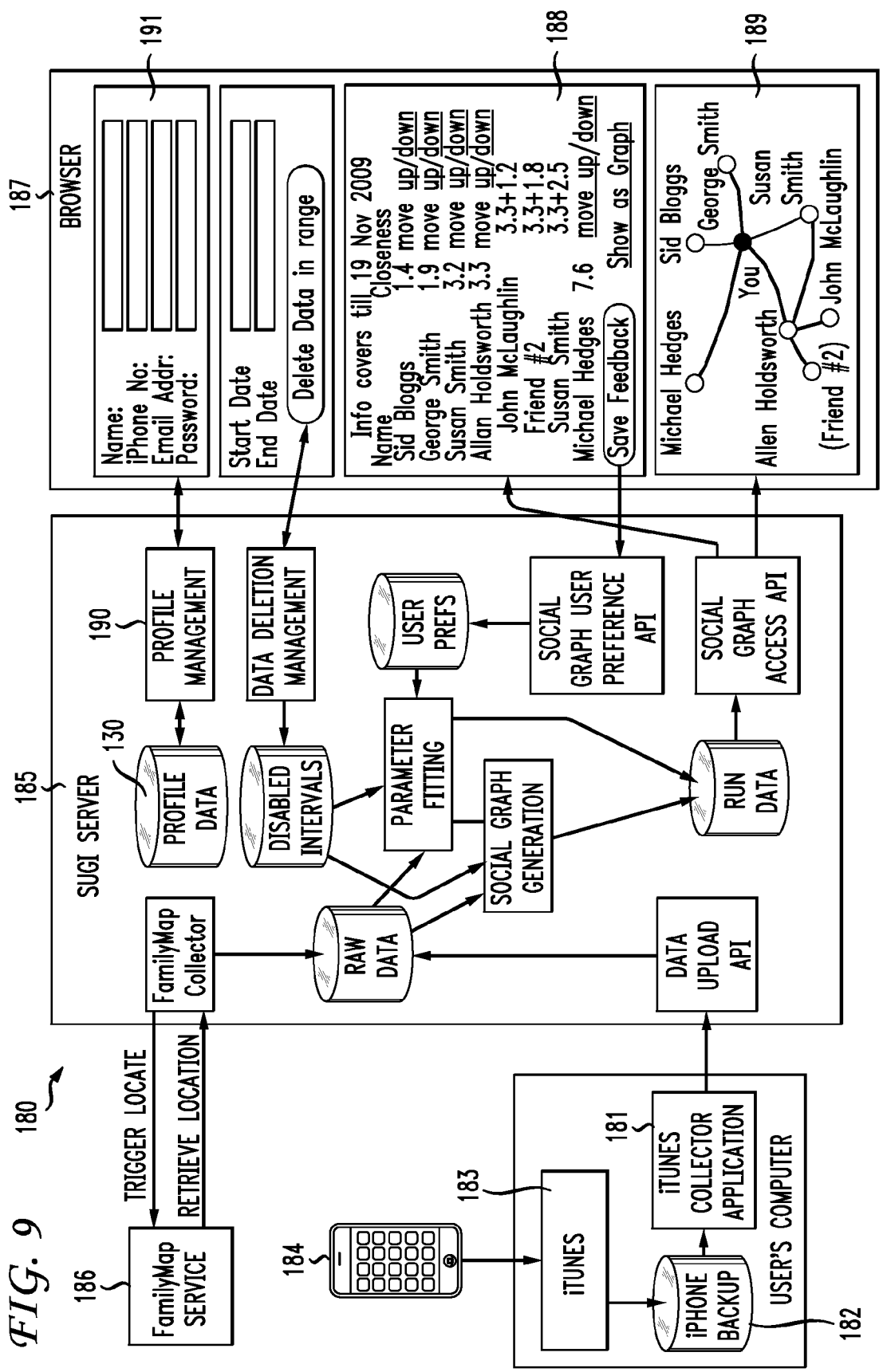
FIG. 9 shows an exemplary flow chart of the server of the social utility grid infrastructure.

The user may then accesses their profile page either by following the link on the confirmation page, or by clicking on an icon linked to the user's account details at any time. FIGS. 8 and 9 provide sample navigation structures 120, 180 of the website of the system 30. As shown in FIG. 8, the user's profile page 130 may include the following. A registered email address 132 and telephone number 134, which may or may not be able to be changed depending on the implementation. A password 136 and the ability for the user to change their password 138.

Additionally, the system is configured such that the user may enter or modify the following information: Full name 140, Demographic information 142, other Email addresses 144, Telephone numbers 144, Street address 146. Moreover, a help pop-up (not shown) may be provided to explain that this information is useful to allow different users to be correlated (i.e., it answers the question: "What would your friends have in their address book as contact details for you?").

The system 30 may also be configured to allow the user to register (or remove) their FamilyMap™ login credentials (not shown). Registration of FamilyMap™ and/or any similar application may include a warning, such as a pop-up window that indicates that the system 30 will retain and use these credentials to locate the user, and that this might have an affect on the battery life of their phone. Use of FamilyMap™ requires the user to explicitly indicate that they allow their social graph 10 information and data to be visible to other users. A help pop-up may be provided to explain privacy concerns. FamilyMap™ may further include links to allow the user to re-download the social utility grid collector 32 and/or to access the data collection control functionality. FamilyMap™ may further be configured to include an option to de-register the software. Alternatively, the social utility grid application 36 may obtain the above FamilyMap™ registration information with the profile information on the original registration page Note, the social utility grid application 36 may be configured to either store or delete previous values of the user's profile data; however, the social utility grid application 36 will use the most current contact details.

The system 30 may further include an unsubscribe button 150 on the user's profile page 130, which leads to user to an unsubscribe page 152. The unsubscribe page 152 may include the following. A checkbox 154 that indicates whether the unsubscribe action should remove all of the user's data from the system 30. The default value may be set as "no." A reminder (not shown) that the user should uninstall the social utility grid application 36, to prevent unnecessary data access and warning dialogs. A confirmation 156 yes/no when the unsubscribe button 150 is pressed.

The general structure of the server web application 120 is a flat hierarchy, as shown in FIG. 8. Common links may be included as a standard header 160, examples include: link to social graph display 162; link to help pages, which may include a web form for support queries; link to the user's profile page; and a logout 164 link.

At the server, both the account activation page and the user's profile page include links to the download page (not shown) for the social utility grid collector 32. This page may include the following: (1) A list of the prerequisites that are required for the application, including OS version, iPhone® version and that backups need to be unencrypted; (2) A suggestion that the user backup their iPhone® with iTunes® frequently; (3) Download links for the available versions of the application.

After download, the user installs the application using the normal mechanism for the relevant operating system. The installer performs the following checks: (1) verification that operating system is a supported version; (2) verification that the application containing the communication data, such as iTunes®, is already installed on the device and is a supported version; (3) verification that a backup directory for holding communication data is already present on the computer, and is unencrypted and for a supported version. If one or more of the above are found to be missing during the install check, one or more error messages may be displayed to the user. Ideally, all missing prerequisites maybe displayed in a single error message to prevent the user having to repeat the install step multiple times as different prerequisites are satisfied. Once the application is installed, it is launched and the account management window 190 is displayed.

If a user desires to uninstall the social utility grid application 36, uninstallation may be performed using normal mechanisms for the relevant operating system of the computing device. For example, using the Windows® operating system, the application includes an uninstall link in its Program menu group. Additionally, the Windows® operating enables the application to be uninstalled via the Control Panel, Add or Remove Programs option. In the Windows® operating system, if active accounts are configured, the uninstaller asks for explicit confirmation before proceeding ("Are you sure? This computer has 2 configured SUGI account profiles that will be lost."). Moreover, on Mac® OS X, the application may be uninstalled by dragging it to the Trash.

The social utility grid collector 32 may include an account management window. In general, data collection can be performed in the device (e.g., iPhone®), on a PC syncing with the computing device (e.g., iTunes® running on host PC/Mac®), or in the Network. The account management window may include a lists details corresponding to the computing devices for which unencrypted backups have been found. Each entry in the list can be selected, and an account configuration window may be displayed. For each entry selected, the user may enter a corresponding email address and password for a matching account on the server.

The main input for the system 30 is communication data 40 related to communication events involving the user 12 (i.e., ego). For system 30 to collect this communication data 40, the user 12 just needs to use their electronic communications device 44 as normal. Thus, the user does not have to alter their day-to-day behavior to make use of the system 30 since the data collection is automatic and based around the existing data trail that the user leaves behind while using their electronic communication device 44.

The social utility grid collector 32 attempts to upload communication data 40 when it has detected that new data has become available from the user's electronic communication device 44. Such new data may be available, for example, after the user 12 backups information on a Smartphone. The social utility grid collector 32 may provide a warning to the user 12 indicating that their communication data 40 is about to be uploaded.

For example, a dialog box with the following features may be used to display the warning: (1) a brief indication of the operation that is about to occur, and a confirmation query, such as, "OK to upload communication data?"; (2) a checkbox with "Don't show this again;" (3) an OK button; (4) a "Try later" button; and (5) a "Show details" button. The OK button indicates that the upload attempt should start immediately. Although, the upload may fail if there is no network connectivity. The "Try later" button indicates that the Collector should attempt upload at a later time, at which point, this dialog may be re-displayed depending on the value of the "Don't show this again" checkbox. Note, if the "Don't show this again" checkbox is ticked, this dialog box will not be shown again for this account, i.e., the particular device 44 that has new backup data, and future upload attempts will occur silently without asking the user for confirmation. To disable upload more generally, the social utility collector 32 offers an "Upload enabled" checkbox on the right-click menu for its system tray icon. If included, the "Show details" button opens a text box, using for example, Notepad or TextEdit, to display the contents of the file that holds the data 40 to be uploaded.

If the user 12 wants to prevent social utility collector 32 from collecting communication data 40 at some point in time, they access a social utility grid application 36, 42 in their desktop browser or their electronic communication device 44. The social utility grid application 36, 42 allows the user to navigate to a page 166 that shows the current status, 167 of communication data collection, and can toggle 168 the current status.

If the user wants to retrospectively remove a period of data 40 from the system 30, the user may access the social utility grid application 36 on their desktop browser and navigate to the data deletion page 172, by for example selecting the "Delete Collected Data" button, and on this page they enter the date/time range 174, 176 that they wish to remove communication data 40. Before proceeding with the deletion operation, the server 38 presents a confirmation dialog that indicates that deleting data may have an effect on the accuracy of their social graph 10. Note, that if the user subsequently uploads communication data 40 that matches the deletion range, the subsequent communication may also be deleted. For example, if the user deletes all of November, but at a later date backs up their device 44 containing call information from November that is new to the system 30, the November data may still be omitted from the social graph 10 results.

Figure 10:
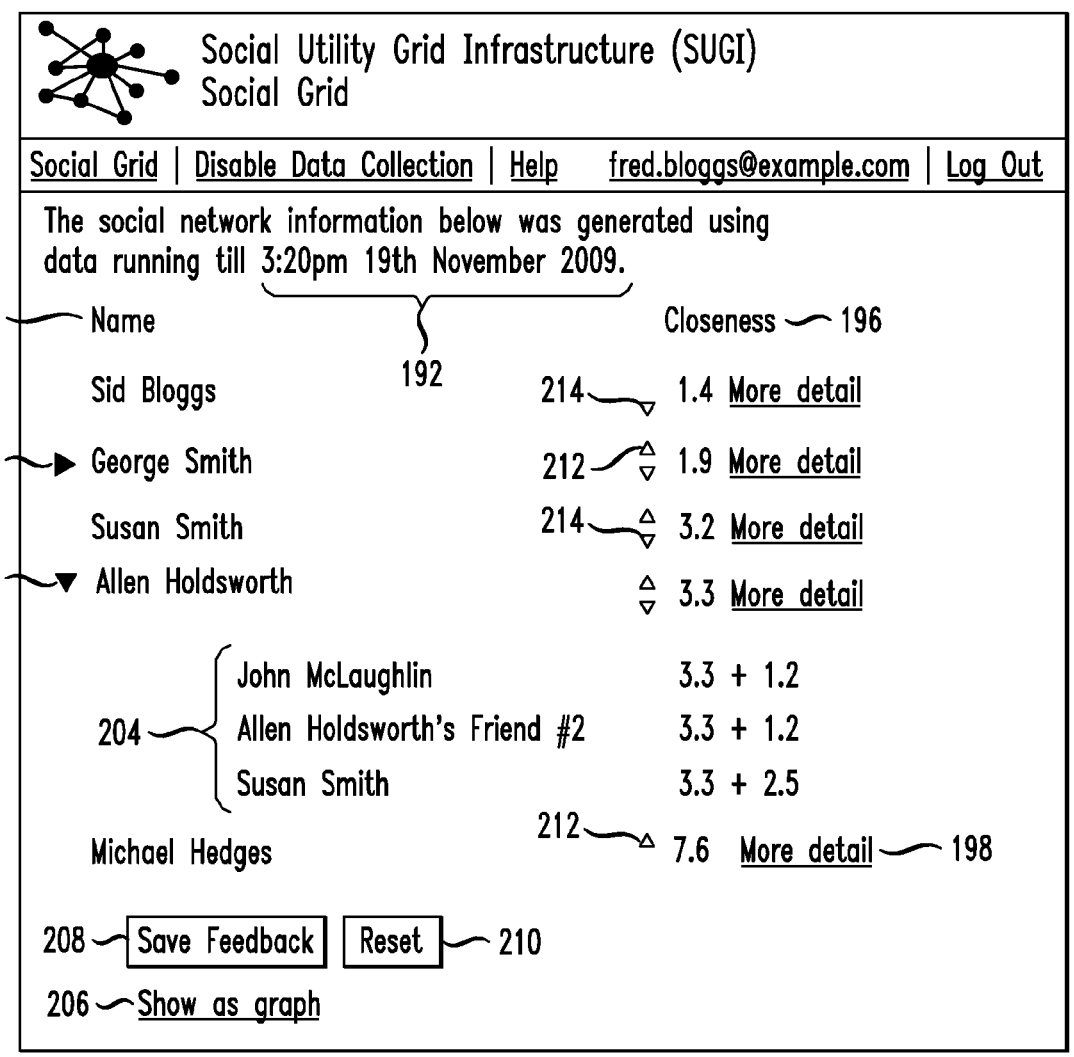
FIG. 10 shows an exemplary social utility grid application interface with the social relationships presented as a list.
Figure 11:
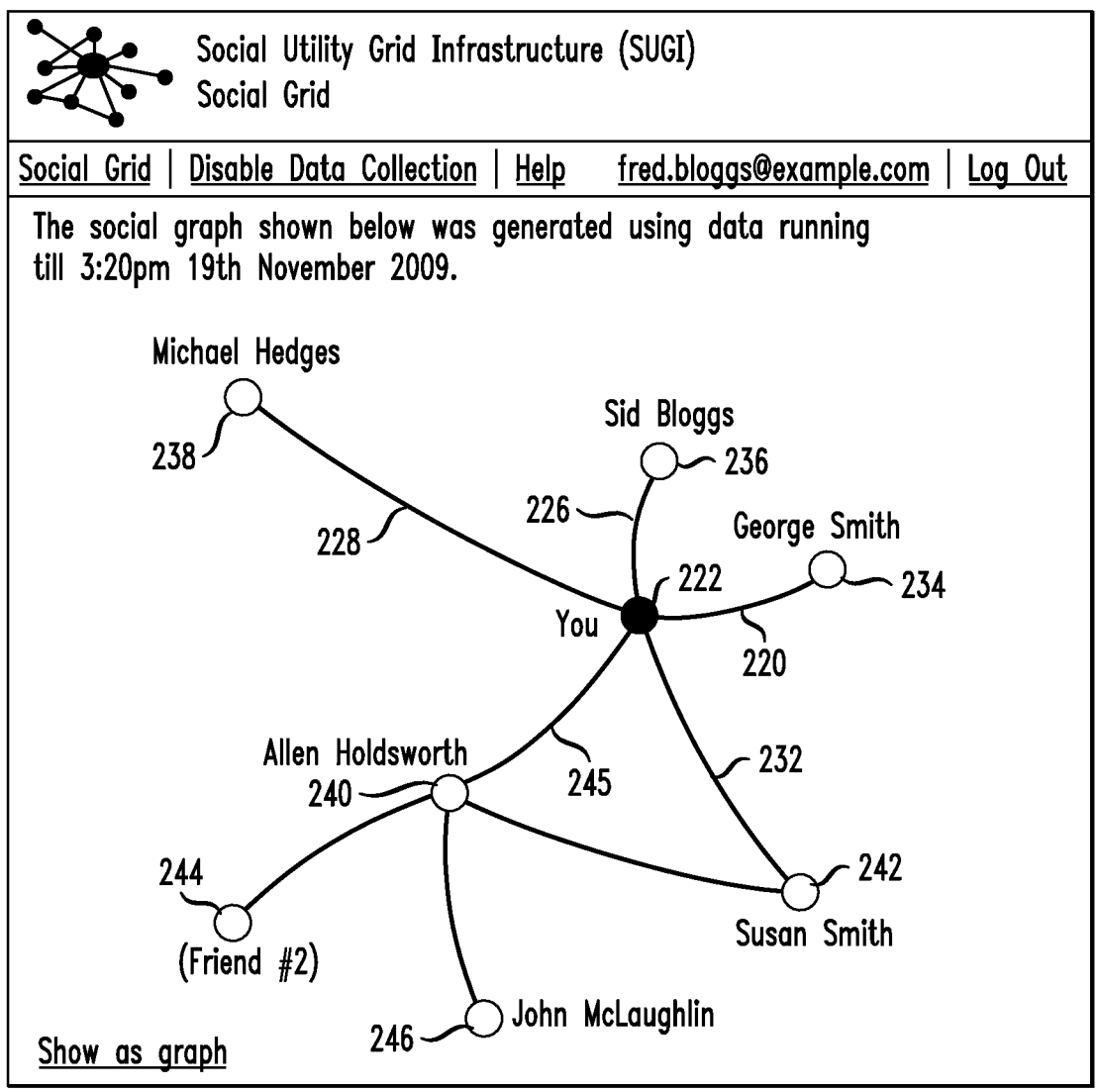
FIG. 11 shows an exemplary social utility grid application interface with the social relationships presented as a graph.
Figure 12:
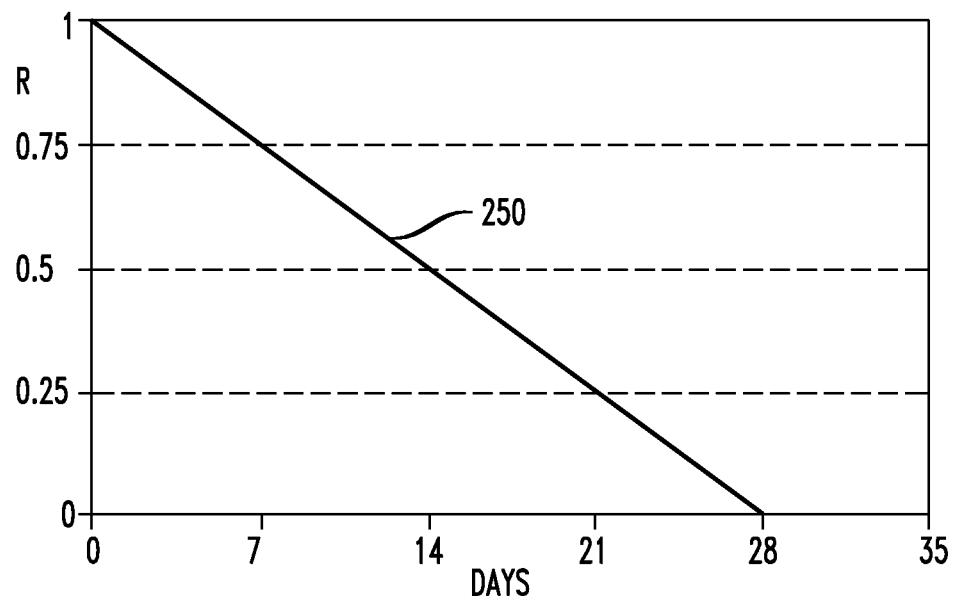
FIGS. 12-17 show graphs of possible decay functions used in the social utility grid calculations.

The user 12 examines their social graph 10 and related information using the social utility grid application 36 which accesses the server 38 and provides social utility grid infrastructure information 190 as shown in FIG. 10. This includes a link to the social graph display page 220, which may include the following, as shown in FIG. 11. The latest date 192 of the raw data 40 included in the social graph 10. A list of the alters 16 in the user's 12 social graph 10, listed in order of closeness (smallest distance first). For each alter 16, the following may be displayed: (1) alter's name 194; (2) closeness value for the alter 196; (3) a "more detail" link 198, which triggers a pop-up display of the detailed communication data 40 relating to that alter 16; (4) buttons to allow the user to move this alter up or down in the list. For alters 16 where second-order social graph 10 information is available, i.e., they are also egos 12 in the system 30, and their permissions settings allow the current user to view their social graph 10, a disclosure triangle ▶ 250 is displayed. When selected, this expands to a down-pointing triangle ▼ 262 and a list 204 of the second-order friends is inserted into the main list. A "Show as graph" button 206, which displays the graph-based display page, i.e., FIG. 11. Buttons providing options to "Save feedback" 208 and "Reset" 210 may also be displayed.

An alternative method for displaying the user's social graph 10 is by drawing it as a graph 220, as shown in FIG. 11. This includes the user 12 as a node 222, at the center, and includes lines 224, 226, 228, 230 and 232 from the user 222 to other nodes 234, 236, 238, 240, 242 that represent the alters 16 in the user's social graph 220. The length (or thickness) of the lines 224, 226, 228, 230, 232, may be used to indicate the closeness of the alter 16; however, length and/or thickness may not necessarily be done accurately, particularly if second-order friends, such as nodes 244, 246 are included in the graph 220.

With reference to FIG. 10, the social utility grid application may further include user interface elements, such as up ▲ 212 and down ▼ 214 arrows that allow the user to re-order their list of friends 192. The user's re-ordering may provide feedback about the accuracy or otherwise of the social graph 220. In operation, the "Save feedback" 208 and "Reset" 210 buttons are initially grayed out. Each alter 16 in the list has a move up ▲ 212 and a move down ▼ 214 button displayed. Note, the relevant button is grayed out for alters 16 at the beginning or end of the list. If the user clicks one of these arrow buttons, the list is reordered and the moved alter 16 is redisplayed in its new position and a different color and/or other indicator may be used to indicate that the position has been changed.

The closeness value 196 depends on the new location in the list, as illustrated herein. For the middle of the list, the new closeness is the average of the closeness values for the alters 14 above and below the new position. For the top of the list: new closeness is half of the closeness value of the previous top of the list alter 16. For the bottom of the list, the new closeness value is 50% more than the closeness value of the previous bottom of the list alter. Once any alter has been moved, the "Save feedback" 208 and "Reset" 210 buttons become available. The "Reset" 210 button restores the page to its original state. The "Save feedback" 208 submits the feedback to the server 38. After the "Save feedback" 208 button is selected, a page may be displayed that thanks the user for their feedback and provides a warning that there may be a delay in the feedback being processed and included in their new social graph 220.

Equations for Social Graph Generation

This section describes the calculations and processing involved in generating the social graph 10 for a user from the raw data collected. The rough overview of the social graph 10 generation process is as follows.

Each type of communication data 40, i.e., call frequency, call duration, and proximity, for a particular ego 12 and alter ego 16 pair is normalized to a closeness value for that type of communication. This normalization process reduces the morass of communication data to a single number, applies scaling factors to make different types of communication approximately comparable, and includes more recent data with a higher importance than older data. The result of the normalization process is a multi-dimensional vector from the ego 12 to each alter 16 that identifies their closeness in each of the different communication types. The Euclidean norm of this multi-dimensional vector is then used as a scalar measurement of the closeness between the ego 12 and the alter 16. The set of alters 16 associated with the ego 12 is sorted according to this scalar measurement.

Each iteration of the social graph 10 generation process for a particular ego 12 and alter ego 16 pair is known as a run. Sufficient information is stored about each run to allow it to be completely reproduced at a later date. The information stored includes the following. Identification of the input raw data used in the run (from both the ego 12 and the alter 16, if the alter 16 is also an ego in the system). Values of normalization parameters used in the run. Values of relationship delay function parameters used in the run. Social graph 10 output from the run. The set of most recent runs contains the user's 12 current best social graph 10 (contained in the output of the run data).

Runs are scheduled to occur in the background, at a frequency that is aimed to be daily (or at worst, weekly). However, if new ordering preference feedback is provided by the user 12, this increases the chance of performing a parameter fitting run, which itself includes the generation of a new, better-fitted, run. Note that each run is specific to a particular ego 12 and alter ego 16 pair. This means that runs can easily be separated across distinct "processors", whether they are threads, processes or machines.

The first stage of the social graph 10 generation process is to normalize each type of communication data 40 that is associated with the ego 12. This section describes the algorithms proposed for this normalization process; however, the algorithms may be modified/tuned as deemed necessary. To allow for modification, it is important that the original raw data is stored as well as the normalized data, so that the normalization process can be re-run at a later date.

Although the detailed form of the normalization algorithm varies for each type of communication data 40, a large fraction of the data types use a similar form of algorithm. For a given ego 12 and alter ego 16 pair, suppose that there are M communication events in the raw data that involve them, occurring at date/times $T_1, T_2, \ldots, T_M$ (where any events that fall within time intervals when the user explicitly disabled data collection have already been removed). If these communication events are not all treated equally, they may each also have an "importance" value, $I_2, I_2, \ldots, I_M$ (where a more important event would have a higher value). If this is the case, then the closeness of the ego 12 and alter ego 16 pair is expressed by the following formula.

$$\text{Closeness} = \frac{1}{\sum_{i=1}^{M} N.R(T_{now} - T_i).I_i},$$

where N is a normalization factor, used to ensure that different types of communication events end up with roughly comparable values of closeness; $R(\bullet)$ is a relationship decay function that provides more weight to more recent events; and $T_{now}$ is the date/time of the run. Note, smaller values of closeness indicate a closer relationship (in other words, closeness acts like a distance).

An example helps to illustrate this formula in action. Suppose the raw data 40 holds events that 1 week ago, 2 weeks ago and 4 weeks ago, and they all have the same importance (and we take the $I_t$ values all to be 1.0). Then, the closeness formula would expand to the following (showing date/time differences in days):

$$\text{Closeness} = \frac{1}{N.R(7) + N.R(14) + N.R(28)}$$

and $$\text{Closeness} = \frac{1}{N}\left(\frac{1}{R(7) + R(14) + r(28)}\right).$$

Now suppose that the relationship decay function is piecewise linear 250, as shown in 12; and that N=2. Then:

$$\text{Closeness} = \frac{1}{2}\left(\frac{1}{0.75 + 0.5 + 0.0}\right) = 0.4.$$

Now we can see how this value would change if there were additional communication events. If an extra 3 communication events occurred 1 week ago, the new value would be $$\text{Closeness} = \frac{1}{2}\left(\frac{1}{0.75 + 0.75 + 0.75 + 0.5 + 0.0}\right) = 0.182,$$

indicating that the ego 12 and alter ego 16 pair are closer than in the original version. If an extra 3 communication events occurred 5 weeks ago, the closeness value would be unchanged since the events are sufficiently long ago that they do not affect the result.

The relationship decay function included in the normalization calculations is used to ensure that more recent data is more important than older data. As such, this function $R(\bullet)$ takes a single argument, which (1) is a date/time difference value, (2) returns a scaling factor in the range [0.0, 1.0], and (3) is decreasing, with $R(0)=1.0$ by convention (since any other initial value could be absorbed into the normalization factor N).

There are several initial possibilities for the shape of this decay function being shown below.

Figure 13:
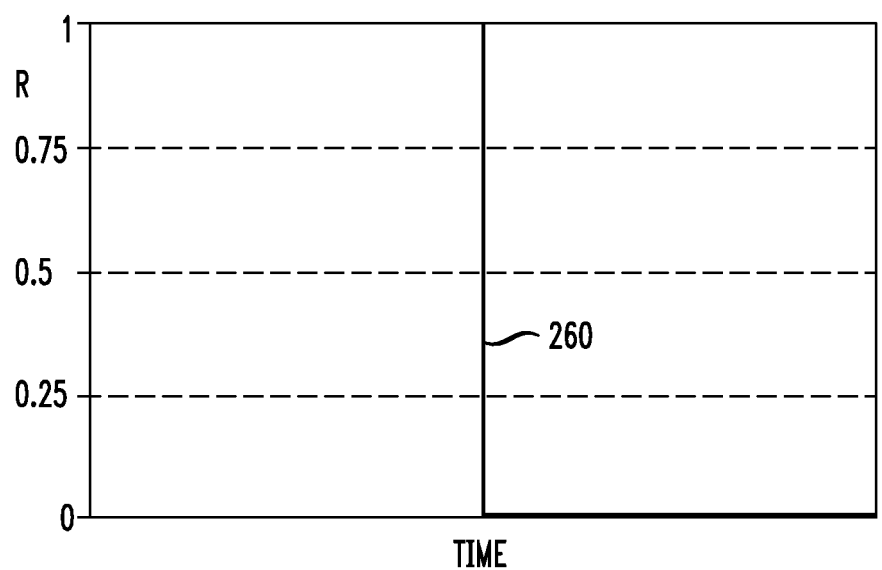

Step:

All data in a particular time interval is considered equally, and all older data is ignored, as shown in FIG. 13 (260). Defined by:

$$R(t) = \begin{cases} 1 & \text{if } t < \tau_{0.5} \\ 0 & \text{if } t \geq \tau_{0.5} \end{cases}.$$

Piecewise Linear.

Figure 14:
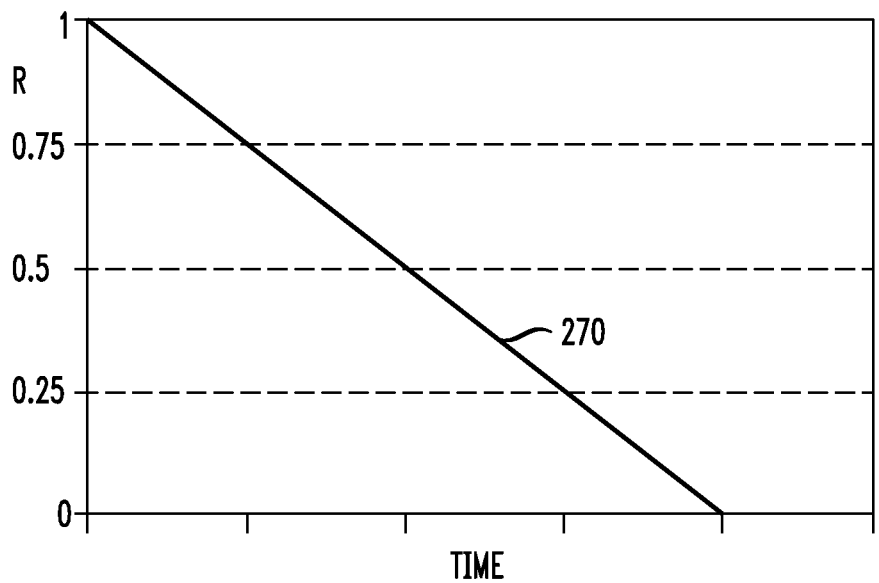

Straight line until the value reaches zero, then zero thereafter, 270 as shown in FIG. 14. Defined by:

$$R(t) = \begin{cases} 1 - \dfrac{t}{2\tau_{0.5}} & \text{if } t < 2\tau_{0.5} \\ 0 & \text{if } t \geq 2\tau_{0.5} \end{cases}.$$

Figure 15:
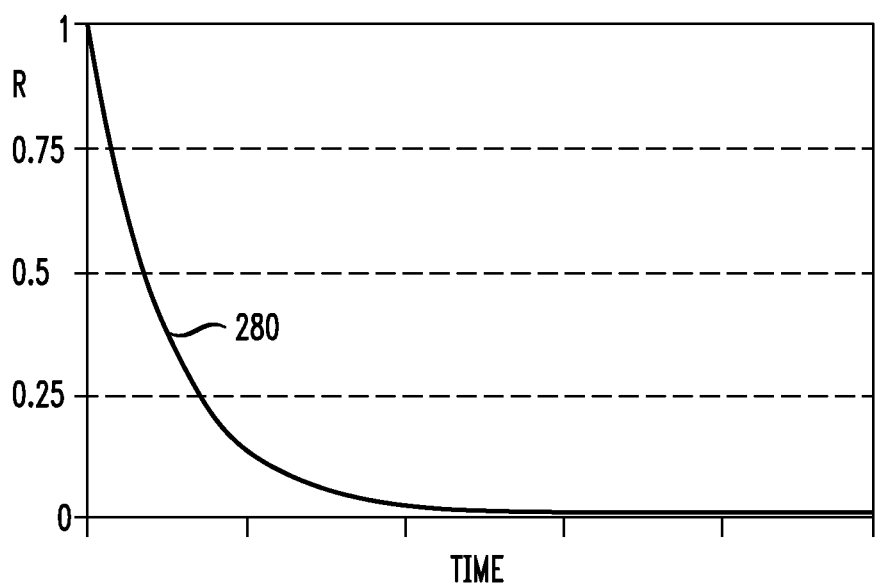

Exponential.
Defined by $$R(t) = 2^{\frac{-t}{\tau_{0.5}}}$$

and shown in FIG. 15 (280).

Figure 16:
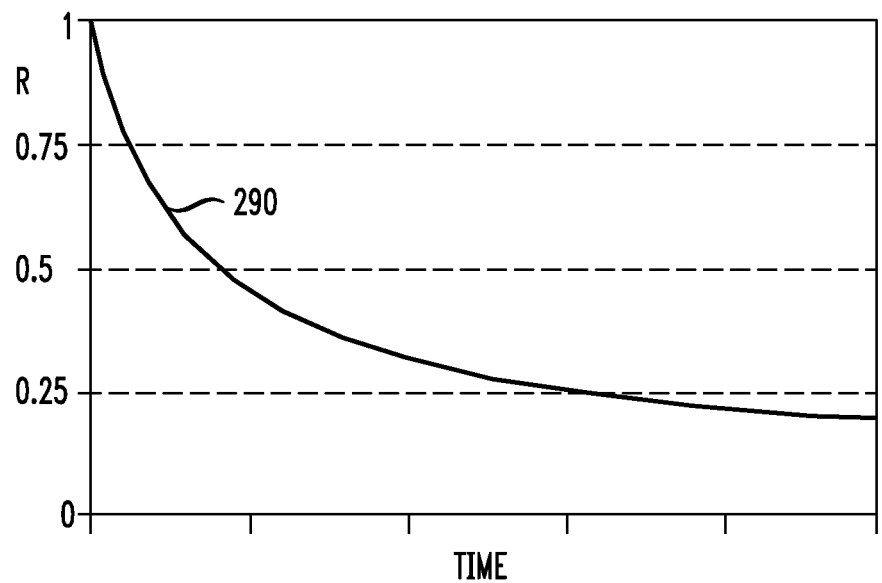

Power.
Defined by $$R(t) = (1+t)^r \text{ with } r = \frac{-\log 2}{\log(1 + \tau_{0.5})},$$

as shown in FIG. 16 (290).

Figure 17:
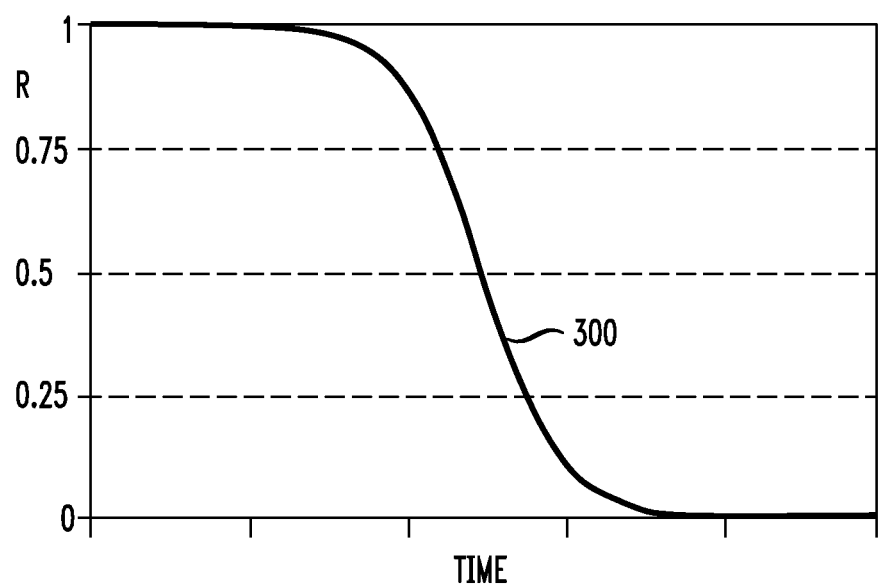

Sigmoid.
Defined by $$R(t) = 1/1 + e^{w(t-\tau_{0.5})},$$

where w is an additional parameter that governs the steepness of the descending portion of the function, 300 as shown in FIG. 17.

For each of these shapes, graphed in FIGS. 12-17, a parameter is needed to indicate the scale of the time axis for the function. By convention, we use the time value $\tau_{0.5}$ at which the value of the graph reaches the value 0.5. indicates that the power function 290, $R(t)=(1+t)^r$ described in FIG. 16 matches real data, with the value of the parameter r falling in the range [−1.842, −0.466] (when t is expressed in years), with a value of −0.716 being appropriate for non-family relationships. See Ronald. S. Burt, Decay functions, Social Networks 22: 1-28 (2000)

Call Data

Each of type of call data generates two different normalized versions of a closeness value, an occurrence measurement and a duration/size measurement. The occurrence measurement, which just tracks the communication instances, is:

$$Closeness_X = \frac{1}{\sum_{i=1}^{M} N_X \cdot R_X(T_{now} - T_i)}.$$

The duration/size measurement, which takes allowance of the extent $S_i$ of the communication, is:

$$Closeness_Y = \frac{1}{\sum_{i=1}^{M} N_Y \cdot R_Y(T_{now} - T_i) \cdot S_i}.$$

Longer duration calls are clearly more likely to indicate a closer relationship than short calls. However, the same may not necessarily apply to voicemails or SMS/MMS messages, where a shorter message may indicate a shared context and closer familiarity between those involved.

These generate the following set of normalized data values for an ego 12 and alter ego 16 pair.

Occurrence closeness for outgoing calls;
Duration closeness for outgoing calls;
Occurrence closeness for incoming calls;
Duration closeness for incoming calls;
Occurrence closeness for incoming voicemails;
Duration closeness for incoming voicemails;
Occurrence closeness for outgoing SMS/MMS messages;
Duration closeness for outgoing SMS/MMS messages;
Occurrence closeness for incoming SMS/MMS messages; and
Duration closeness for incoming SMS/MMS messages.

With the assumption that SMS/MMS messages that were sent from a single ego 12 to multiple alter 16, recipients are treated as for a normal message; that is, the single message appears in the normalization calculations for each of the recipient alters with no other weighting.

Address Book Data

For contact in an ego's address book, the closeness value is calculated as $$Closeness_{contact} = \frac{1}{N_{contact} \cdot S_{contact}},$$

where $S_{contact}$ is a count of the number of distinct endpoint addresses that the ego 12 stores for this particular alter. Thus, contacts with more addresses are closer. This calculation does not use or scale the historical contact information for age.

Proximity Data

Individuals who are often in the same place at the same time are likely to be closer than those who are not. The location data is processed to detect proximity events. Because proximity requires location data for both individuals, this closeness calculation may only possible for alters 16 who are also participants (egos). Location data is a collection of data instances of the form (t, x, Δ), ordered by t:

t indicates the date/time that the location data was retrieved x indicates the location of the ego 12 at that date/time Δ indicates the accuracy of the location; locations determined by GPS may have an accuracy of ~10 m, whereas locations determined by cell tower may only have an accuracy of ~500 m.

If two consecutive location data points $(t_1, x_1, \Delta_1)$ 312 and $(t_2, x_2, \Delta_2)$ 314 are close enough together, we assume that the individual moves linearly between them. Consecutive location data points are considered "close" when:

The time difference $(t_2-t_1)$ is below a threshold (say 30 minutes)—if the data points are widely separated in time, then interpolating between them is very unreliable.

The speed of movement $(|x_2-x|/(t_2-t_1))$ is below a threshold (say 5 meters/second), if the ego 12 is travelling at speed, they are unlikely to be interacting with others.

However, this simplification ignores the possibility that two individuals are sharing the same mode of transport (car/train/bus/plane). This assumption of linear movement means that for date/time values t in the interval $[t_1, t_2]$, we assume that the individual's position is:

$$\vec{x}(t) = \frac{(t-t_1)}{(t_2-t_1)}(\vec{x}_2 - \vec{x}_1) + \vec{x}_1,$$

and the uncertainty in that position is:

$$\Delta(t) = \frac{(t-t_1)}{(t_2-t_1)}(\Delta_2 - \Delta_1) + \Delta_1.$$

This formula assumes that the distances involved are sufficiently short that the surface of the earth can be treated as locally flat.

Figure 18:
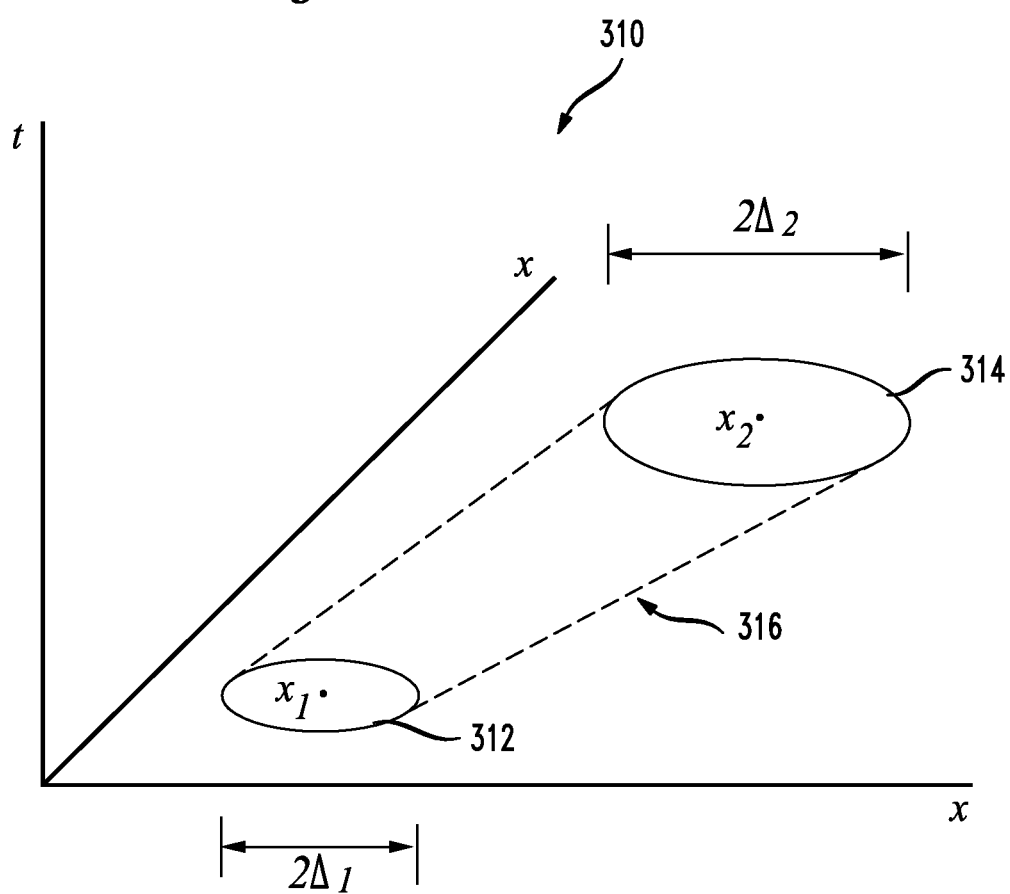
FIG. 18 shows a graph of proximity data for use with location information collected by the social utility grid collector.

This generates a section of cylinder in space/time 316, or more accurately, a section of a cone, since the uncertainty may be different at the start and end points, as shown in FIG. 18. Proximity events occur when these cone sections intersect for different individuals, which is calculated as follows.

If the first pair of location data points are $(t_1, x_1, D_1)$ & $(t_2, x_2, D_2)$ and the second pair of location data points are $(s_1, y_1, E_1)$ & $(s_2, y_2, E_2)$, then on the overlap time interval $[t_1, t_2] \cap [s_1, s_2]$ the vector from the first to the second individual is:

$$\vec{y}(t) - \vec{x}(t) = \frac{(t-s_1)}{(s_2-s_1)}(\vec{y}_2 - \vec{y}_1) + \vec{y}_1 - \left(\frac{(t-t_1)}{(t_2-t_1)}(\vec{x}_2 - \vec{x}_1) + \vec{x}_1\right)$$

$$= t \cdot \left(\frac{(\vec{y}_2 - \vec{y}_1)}{(s_2-s_1)} - \frac{(\vec{x}_2 - \vec{x}_1)}{(t_2-t_1)}\right) +$$

$$\left(\vec{y}_1 - \vec{x}_1 + \frac{t_1(\vec{x}_2 - \vec{x}_1)}{(t_2-t_1)} - \frac{s_1(\vec{y}_2 - \vec{y}_1)}{(s_2-s_1)}\right)$$

$$= t \cdot \vec{A} + \vec{B},$$

for vectors A and B (which can be calculated from the location data). Using components $(A=(A_1,A_2), B=(B_1, B_2))$, the square of the distance between the individuals at time t is:

$$|\vec{y}(t) - \vec{x}(t)|^2 = (A_1 t + B_1)^2 + (A_2 t + B_2)^2$$
$$= (A_1^2 + A_2^2)t^2 + (2A_1 B_1 + 2A_2 B_2)t + (B_1^2 + B_2^2)$$
$$= A^2 t^2 + Ct + B^2.$$

This distance is a parabola because $A^2$ is positive and is U-shaped; and therefore, the distance has a global minimum value at:

$$t_{min} = \frac{-C}{2A^2} = \frac{-(A_1 B_1 + A_2 B_2)}{A_2}, \; |\vec{y}(t_{min}) - \vec{x}(t_{min})|^2 = \frac{-C^2}{4A^2} + B^2.$$

There are then three possibilities for closest approach of the two individuals, depending on where this minimum time value $t_{min}$ falls relative to the overlap time interval $[t_1, t_2] \cap [s_1, s_2] = [o_1, o_2]$:
- If the overlap time interval is entirely before $t_{min}$, the closest approach is at the end of the overlap time interval $t_{closest} = o_2$.
- If the overlap time interval is entirely after $t_{min}$, the closest approach is at the start of the overlap time interval $t_{closest} = o_1$.
- If the overlap time interval contains $t_{min}$, the closest approach is at $t_{closest} = t_{min}$.

This closest approach is counted as a proximity event if the distance between the individuals is smaller than either of the location uncertainties at that time, that is if $$A^2 t_{closest}^2 + C t_{closest} + B^2 \leq \min(D(t_{closest}), E(t_{closest})) =$$
$$\min\left(\frac{(t_{closest} - t_1)}{(t_2 - t_1)}(D_2 - D_1) + D_1, \frac{(t_{closest} - s_1)}{(s_2 - s_1)}(E_2 - E_1) + E_1\right).$$

These proximity events are calculated into a closeness value as follows.
For each consecutive pair of location data points for ego A
  If location data points are close enough
    For each consecutive pair of location data point for ego B
      If time interval for B overlaps time interval for A
        If location data points are close enough
          If cone section for A intersects cone section for B
            Add N.R(time_now−time of intersection) to Sum
          Endif
        Endif
      Endif
    Endfor
  Endif
Endfor
Closeness=1/Sum.

Calendar Data

Calendar events that include attendee information are useful to the system 30, because they indicate probably proximity events. As an initial filtering step, each calendar event with a non-empty set of attendees is reduced to a canonical form. Required and optional attendees are merged together. All duplicate addresses are removed. Any instances of any of the ego's 12 email addresses are removed from the list.

After this has been performed, the closeness formula is as follows.

$$Closeness_{calendar} = \frac{1}{\sum_{i=1}^{M} N_{calendar} \cdot R_{calendar}(T_{now} - T_i) \cdot (1/A_i)},$$

where $A_i$ is a count of the number of distinct attendees of the meeting (so that meetings involving a larger group of people count less towards closeness than smaller meetings).

Topic Data

As well as direct communication events between individuals, the social graph 10 may also be influenced by pairs of individuals who are interested in the same topic. See Andreas Harrer et al, Combining Social Network Analysis with Semantic Relations to Support the Evolution of a Scientific Community, 2007. The key features of this type of data are as follows. This type of data is only available for pairs of egos 12. That is, when examining an ego A and an alter B, topic correlation can only be performed if B is also identifiable. Two people interested in the same topic should increase their closeness. Ideally, the increase should depend on the overall number of people interested in that topic. If a large number of people are interested in a particular topic (e.g., "CNN News"), it is unlikely to indicate much increase in closeness, whereas a more specialist topic (e.g., "Seattle tides") has a greater chance of indicating a shared interest.

For example, topic data covering the number of iPhone® applications (NAPPS) installed may be expressed by:

$$Closeness_{apps} = \frac{1}{N_{apps} \cdot S_{apps}},$$

where $S_{apps}$ is a count of the number of applications that the ego 12 and the alter 16 have in common.

Email Data

As an initial filtering step, each email has its addressing information reduced to a canonical form.
The To: and Cc: lists are combined.
All duplicate addresses are removed.
Any instances of any of the ego's 12 email addresses are removed from the list.

After this has been performed, the closeness formula is as follows.

$$Closeness_{email} = \frac{1}{\sum_{i=1}^{M} N_{email} \cdot R_{email}(T_{now} - T_i) \cdot (1/S_i)},$$

where $S_i$ is a count of the number of distinct recipients of the email (so that emails addressed to a larger group of people count less towards closeness than emails with a smaller distribution list).

Social Graph Output

The previous section described the normalization process applied to each different type of communication data 40. The first-order social graph 10 for an ego 12 is simply this collection of normalized data, for all possible alters 16, and may be considered in two forms.

The multi-dimensional form includes all of the different closeness values; that is, it is a set of 13-dimensional vector ($Closeness_{call\ out\ \#}$, $Closeness_{call\ out\ dur}$, . . . , $Closeness_{calendar}$).

The scalar version of the closeness is the set of Euclidean norm of the multi-dimensional version, $$Closeness = \sqrt{Closeness_{call\ out\#}^2 + Closeness_{call\ out\ dur}^2 + \cdots + Closeness_{calendar}^2},$$

for each alter.

Fitting User Preference Data

Once the social graph 10 has been generated, it is presented to the user 12 and they may provide feedback indicating that they disagree with the ordering of alters obtained. The scalar closeness of a particular alter B for an ego A is produced by a calculation based on the raw communication data 40, together with a number of parameters:

The normalization parameters $N_{email}$, $N_{calendar}$, etc.
The characteristic timescale $\tau_{0.5}$ of each of the relationship decay functions $R_{email}$, $R_{calendar}$, etc.

If these parameters are described as $P_1, P_2, \ldots, P_K$, then the overall form of the calculation is: Closeness(B)=F(rawdata; datetime; $P_1, P_2, \ldots, P_K$). The user's feedback about where alter B should appear in their social graph 10 provides a desired value of Closeness(B). This is used to generate new values of the parameters that produce a more accurate value for the closeness for B when used in the calculations.

This is achieved by using the Levenberg-Marquardt algorithm to numerically minimize F(rawdata; datetime; $P_1$, $P_2, \ldots, P_K$)–DesiredCloseness(B) over the parameters $P_1$, $P_2, \ldots, P_K$. See Press W. H. et al, Numerical Recipes in FORTRAN—The Art of Scientific Computing, 2d Ed. (1992), Cambridge University Press, New York, pp. 675-94; Robert B. Hayes et al., An assessment of the Levenberg-Marquardt fitting algorithm on saturating exponential data sets, Ancient TL, Vol. 16, No. 2 (1998); Levenberg-Marquardt Algorithm, http://en.wikipedia.org/wiki/Levenberg-Marquardt_algorithm, last visited Feb. 12, 2010. This algorithm uses the Jacobian matrix of derivatives of the function being minimized, so a numerical differentiation process is also required because the function is not available in closed form. This Jacobian is block-diagonal because the only parameters that can affect a particular component (say, the outgoing SMS frequency) are those that relate to the calculation of that component (the N and $\tau_{0.5}$ parameters for that calculation). As a result of this, performing the parameter fitting operation is likely to be very computationally expensive.

In order to obtain initial parameter values to use in social graph 10 calculations for the first users of the system, the raw data from MIT's Reality Mining experiment will be used. See Nathan Eagle, The Reality Mining Data, http://reality.media.mit.edu, last visited Feb. 12, 2010; Nathan Eagle, et al., "Inferring Social Network Structure using Mobile Phone Data, Proceedings of the National Academy of Sciences (PNAS), 2009, Vol. 106 (36), pp. 15274-78. The contents of the s.comm dataset provide data that is equivalent to the call data of the system 30. It includes date/time, recipient, direction, duration and type. The s.device_date, s.device_macs and s.mac datasets provide high-resolution proximity data generated through Bluetooth proximity checks. The network.friends, network.lab and network.out-lab datasets provide survey data that can be used to approximate user preference data.

Supervisory Override

Some relationships have an importance that is not affected by the frequency of communication events, for example, family relationships (father/son, brother/sister) or work relationships (manager/managee). The automatically generated social graph 10 cannot reflect the importance of these relationships, because it cannot necessarily be deduced from the data. As a result, it is useful if a user 12 can apply a supervisory override to explicitly mark particular relationships as important (or possibly as unimportant: "I don't care how many times I call V to complain about their service, they're definitely not my friend").

This type of feedback is different than the preference feedback. User preference data indicates that the output of the social graph algorithm is not correct, Supervisory override indicates that the social graph algorithm should not apply to this particular alter 16. When available, supervisory override data therefore overrules any output from the social graph 10 generation process.

The parameter fitting process described above results in a new set of parameter values that give a better fit to the user's preferences for a particular ego 12 and alter ego 16 pair. This leads to two possible directions for induction. By examining all of the parameter values fitted for different alters 16 of the same ego 12, it may be possible to determine a new default set of parameters that work well for that ego 12 regardless of the alter 16 involved. By examining all of the parameter values fitted for all egos 12 and all of their alters 16, it may be possible to determine a new default set of parameters that work well across the entire system 30.

Second-Order Social Graph

All of the calculations described so far in this chapter have involved the production of the first-order social graph 10 for a particular ego 12. This graph only includes the alters 16 that the ego 12 has directly communicated with. The second-order social graph 10 includes friend-of-friend information. This is only possible for those alters 16 who are also participants in the service, i.e., are also egos 12. The correlation between the ego A's alter and ego B is performed using their identifying email address or telephone number.

The second-order social graph 10 also involves answering the following difficult question. If the multi-dimensional closeness from A to B is $(x_1, x_2, \ldots, x_D)$ with scalar distance x, and if the multi-dimensional closeness from B to C is $(y_1, y_2, \ldots, y_D)$ with scalar distance y, then what do we expect the multi-dimensional and scalar closeness from A to C to be?

Assuming that the scalar distance from A to C would simply be x+y is overly naïve, as it takes no allowance of the multi-dimensional nature of the closeness vectors. However, assuming that the multi-dimensional closeness from A to C is $(x_1+y_1, x_2+y_2, \ldots, x_D+y_D)$ is also not necessarily accurate. For a particular communication type (i.e., a component of the vector), there is not a priori reason to believe that two measurements should combine by simple addition. For example, if A calls B on a daily basis, then the closeness value for this communication type is likely to be small (close). If B also calls C on a daily basis, then that closeness value will likewise be small. Adding these two values together gives a smallish value, which should therefore indicate that A calls C on a nearly-daily frequency, which may or may not be the case.

This issue is made more complicated by the asymmetry of the relationships between egos 12 since the closeness measurement from A to B may be completely unrelated to the closeness measurement from B to A, and which is relevant depends on the context. If A wants to ask C out on a date, then closeness values from C to B and from B to A should be combined to determine which ego B is the best route for an introduction. (This direction relies on C also being a participant in the service). If A wants to block calls from friends-of-friends who are not particularly close, then closeness values from A to B and from B to C should be combined to determine who to admit.

Finally, another aspect to consider is what the effect of multiple routes to a single destination ego 12 should be. If A is connected to B, C, D, E and F, and they in turn are all connected to X, what should A's closeness to X be? Should it involve an aggregation of the different paths that reach X (A→B+B→X, A→C+C→X, A→F+F→X)? Should it merely involve the shortest of these paths, according to whatever mechanism for combining closeness values (as above) is used (the social network analysis literature refers to such paths as geodesics).

The best way to approach the issues are to look for answers in the data, using a "drop-one-out" method. In this method, all data relating to a particular alter X is elided from the calculations of ego A's social graph 10. Alter X now no longer appears as a first-order friend, but all of the possibilities above can be worked out for X being a second-order friend (i.e., a friend-of-friend). All of these results can be compared with the original results, and the approach for calculating A→?→X that most closely matches the direct result A→X selected.

Server: Additional Features and Functionality

The server 38 of the SUGI may be implemented using a web application framework, such as the Django web application framework; as such, references to some particular features of Django are included in this section. The server 38 is fundamentally a standard three-tiered web application. The first tier is the presentation tier, which displays information in a form accessible to the user, accepts user input, and provides initial data validation. In a web application, this is implemented in the user's browser in HTML and JavaScript. The second tier is the application tier, which consists of all of the server-side processing that is needed to provide additional function over and above the raw contents of the data tier, implementing any business logic and access controls. The third tier is the data tier, consisting of the database servers and the databases and tables that they contain.

Figure 19:
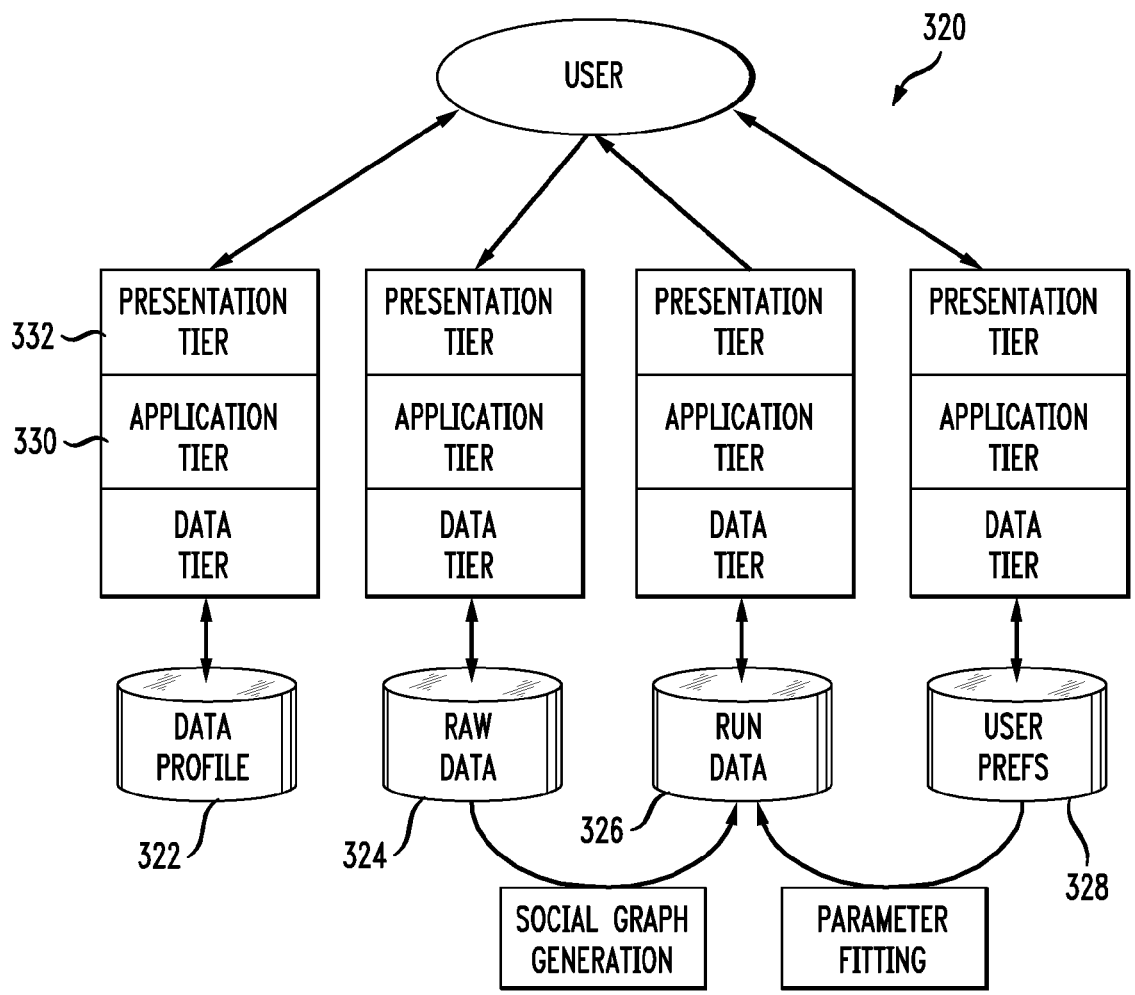
FIG. 19 shows exemplary web application tiers for the server of FIG. 9.

This approach is similar to the Model-View-Controller (MVC) design pattern, where the key difference is that the presentation tier (the View) never directly communicates with the data tier (the Model), but instead always communicates via the application tier (roughly, the Controller). As shown in FIG. 19, these three tiers may be repeated for four distinct areas of functionality 320: (1) profile management 322, to allow users to maintain their profile information 322; (2) raw data management 329, to allow the collector application to upload of raw data; (3) run data 326 for social graph 10 access, to allow display of the social graph 10 to the user; and (4) accepting user preference feedback 328, to allow users to provide preference feedback on the social graph 10 results.

SUGI Server Logical Architecture Schematic

The following four areas of functionality effectively correspond to four distinct databases that are only loosely coupled with each other and the mainline functionality normally affects a single database at a time. However, the following areas of functionality involve interactions outside of the "home database" for an area of functionality. (1) Profile management allows the user to delete their raw data, which in turn has an effect on all of the other databases. (2) Profile management allows the user to set the visibility of their data to other users, which affects the social graph 10 access possibilities for those users. (3) Social graph access may require use of the profile database 322 to confirm whether the user has permission to view other users' data. (4) Social graph access includes the (read-only) display of detailed information from the raw data database 326 to show the history of communication between a user and a particular alter.

The features of the server 38 described below apply across all of the different areas of functionality. Access to all server-side functionality requires the user to be authenticated (e.g., in Django, by using the @django.contrib.auth. decorators.login_required decorator for all view methods) and connected over SSL using certificates from a well-known signing authority. Note that this requires use of the profile database 322. The SUGI web application accepts connections on the normal web server port (80 for HTTP, 443 for HTTPS), and determines which functionality is required based on URL schemas (e.g., in Django, by using django.conf.urls.defaults). A standard object-relational model (ORM) from underlying framework is used to represent the structure of the database tables (e.g., achieved in Django by subclassing django.db.models.Model). Presentation details are kept separate from any logic that generates or processes content, maintaining the separation between application 330 and presentation 332 tiers (e.g., in Django, by using the Django template system, django.template). A standard data description format such as XML or JSON is used for all transmission of data values across APIs (e.g., in Django, django.core.serializers supports both XML and JSON). All server-side functionality uses a common diagnostics and error logging framework. These features are implemented as common library functions that are used by the rest of the server 38.

The first area of the server that users encounter is the profile management function. This area includes the following distinct areas of functionality.

- Generating an invitation email requesting that potential users subscribe to the service.
- Allowing users to register for the system (which may require verification that they have been invited)
- Allowing users to enter profile information, and verifying that the profile is sufficiently complete.
- Generating a verification email for new users to confirm that the email address they have registered is genuine
- Generating password reset emails for users who have forgotten their passwords
- Optionally entering FamilyMap™ credentials (and displaying a warning about the security implications of this), and triggering the FamilyMap™ collector to verify that they are correct.
- Allowing users to specify which other users their profile and social graph 10 information graph should be available to: no-one, direct friends, friends-of-friends, strangers with related interests, or everyone.
- Allowing the user to specify a range of date/times for which all data should be removed from the system.
- Allowing the user to remove themselves from the system 30, which also offers the option for them to delete all of their communication activity data.

The majority of this functionality is based on standard web application profile management function, such as implemented in the django.contrib.auth Django application.

The profile management function allows users to indicate that they currently do not want communication data 46 to be collected by the server 38 (or to re-enable data collection after it has been disabled) and delete any of their existing communication data that falls within a specified range of dates. In either case, this results in the addition of entries in a database table that indicates date/time ranges for which communication data should be omitted from the social graph 10 calculations. The first feature is then a special case of the second, where the time interval does not (yet) have an end date.

When an entry is added to this table of collection disabled intervals, particularly if the date range is historical rather than current, any existing runs that make use of the now-omitted data are no longer valid. Correcting this situation is a wide-ranging operation that involves the following. Scanning all of the raw data tables 324 for any data that falls within that range and potentially removing it. Scanning the run database 326 and removing any runs that used raw data that has now been omitted. Scanning the run database 326 for all other users, removing any runs that relied on the original user's raw data (for example, for proximity matches). Triggering new runs for any affected users.

The data upload API is used by, for example, the iTunes® collector application may be used to transfer raw data from the user's iPhone® backup files into the raw data database. The API is only available to authenticated users over SSL connections to the server 38. This API (and the underlying database table) is implemented as a fixed format; this makes future enhancement more difficult but eases implementation and improves performance.

In the interface, each upload operation includes the following pieces of information.
  Identification of the collector application that is the source of the data.
  Application name (e.g., "iTunes® Collector/Windows®") and source ("com.att.labs").
  Version (e.g., "1.2").
  Subscriber identification (e.g., "+1 (515) 555 1234"+ "fred.bloggs@gmail.com") is implicitly included via the authentication process, but is also explicitly included in the data upload to allow ease of management.
  Multiple sets of raw data rows. Each set includes the following information.
  Indication of the type of raw data involved (e.g., "Call log").
  Multiple rows containing the raw data, in a format that is specific to the type of data (e.g., "endpoint=+ 442083661177, date=2009-11-16T22:01Z, duration=32, direction=out").
  Information about any new periods when the user explicitly specified that data collection should be disabled.

The server-side implementation of this API performs two levels of data verification before committing the data to the raw data database. Syntactic verification: check that the new row contains all required fields, and that all fields are of valid type and in a valid range. This verification step is self-contained—it does not rely on any contents of the raw data database. Consistency verification: check that the new row is consistent with other rows that already exist in the relevant table. The detail of each of these verification steps depends on the particular type of data being uploaded.

The social graph 10 access API allows a user to retrieve their most up-to-date social graph 10 from the server 38. This query operation is only allowed for authenticated users over SSL connections to the server 38.

The main set of information retrieved using this API is the user's first-order social graph 10. This holds a list of alters that are part of the user's social graph 10, ordered by closeness (closest first). For each alter the following information is provided: (1) Alter ID (current name from the user's address book, or an endpoint address); (2) multi-dimensional closeness vector from the ego 12 to the alter 16; (3) scalar closeness from the ego 12 to the alter 16; (4) run ID that produced these closeness values.

The API also allows ego A's second-order social graph 10 to be retrieved. For each alter that is also a participant in the study (say as ego B), and who has given permission for others to access their social graph 10, the API returns a list of B's alters, ordered by closeness. For each such second-order friend the following information is provided: alter name, or a system-generated identifier if none is available (e.g., "Ego B's friend #7"). Note that no endpoint addresses are exposed for second-order friends; (2) multi-dimensional closeness vector from the ego 12 to the alter 16; (3) scalar closeness from the ego 12 to the alter 16; and (4) run ID that produced these closeness values.

Finally the interface also allows the user to see detailed information about their communication with a particular alter 16. For a given ego 12 and alter ego 16 pair and for a given range of date/time, the API returns all of the matching information from the raw data database.

The user 12 may indicate that a social graph 10 produced by the system 30 is not completely accurate. This arrives at the server 38 via the user preference API. The API is only available to authenticated users over SSL connections to the SUGI server.

Each feedback operation includes the following pieces of information.
  Identification of the feedback application that is the source of the preference data.
  Application name (e.g., "SUGI Feedback Web Application") and source ("com.att.labs")
  Version (e.g., "1.2")
  Subscriber identification (e.g., "+1 (515) 555 1234"+ "fred.bloggs@gmail.com") is implicitly included via the authentication process, but is also explicitly included in the data upload to allow ease of management.
  The run ID of the original data that the user is providing feedback on.
  Multiple sets of raw data rows. Each set includes the following information.
  Indication of the alter whose closeness is being corrected.
  The original multi-dimensional closeness vector from the ego 12 to the alter 16.
  The original scalar closeness from the ego 12 to the alter 16.
  The new scalar closeness from the ego 12 to the alter 16.
At the server side, this data is verified for consistency and is added to the user preference database. A parameter fitting operation is also triggered.

Web Application

This section describes the features of the system 30 as seen by a user accessing the website—in other words, interacting with SUGI as a web application. This is closely tied to the functionality described in the previous section, and makes use of the APIs for social graph 10 access and social graph 10 user feedback. All of the pages of this web application may include versions that are easily accessible using the browser various types of computing devices.

The system 30 presents profile management web pages as shown in FIG. 8, in a manner common to most web applications.
  The main landing page provides information about the system, and allows the user to navigate to either the registration or login pages 350.

The registration page 352 requires the user 352 to enter their telephone number 362, primary email address 364, password 366 and password confirmation 368. This page is only available if uninvited sign-up is allowed.

If registration fails (for example, the user already exists in the system), the page is redisplayed including error information.

If registration succeeds, a confirmation email is sent to the user and a page explaining this is displayed.

The login page 350 has a form allowing the user to enter their email address 354 and password 356, together with a "Login 358" button and a "Register 360" button.

If login fails, the login page 350 is redisplayed including error information.

If the user resets their password, a newly generated password is sent to the email address specified (provided it matches a user in the system) and a page explaining this is displayed.

Once logged in, all other pages in the web application have a standard header 160 that includes "Show social graph" 162, "My Profile 163" and "Logout 164" links.

The logged-in landing page includes links to allow the user to download the collector application 32.

The user's profile page 130 includes all of the information.

The main display page for the user's social network includes the features described herein, which are retrieved from the run database 326 table as follows.

Find all runs for the ego 12 in question, and generate the set of alters 16 that the ego 12 communicates with. For each such alter 16.

Find the most recent run for that ego 12 and alter ego 16 pair.

Determine whether the alter 16 is also an ego 12 in the study.

Sort the list according to the scalar closeness of the ego 12 and alter ego 16 pair in the most recent run.

The main display page for the user's social network includes UI features that allow the user to give feedback 190 about the social graph 220. When the user re-orders a particular alter 16, the scalar closeness distance that is used as the feedback value for the scalar closeness is calculated from the closeness values of the neighboring alters in the list—that is, the user does not provide an explicit closeness value. When the user submits their feedback, it is stored in the explicit preferences database and a new parameter fitting run is scheduled.

Graphically displaying the user's social graph 10 makes use of third-party graph plotting libraries, using the same information as the previous section.

For a graph that just includes first-order friends, the angular separation between alters 16 is ($2\pi$/number of alters), and the length can be displayed accurately.

For a graph that shows second-order friends, the lengths cannot be displayed accurately (for example, if A→B is length 1 and B→C is length 2, but A→C is length 20, there is no way to portray these lengths correctly in a triangle ABC).

Example Embodiment

With reference to FIG. 9, an exemplary embodiment 180 of the system 30 is provided. The scope of this embodiment 180 is much more limited than the full architecture for SUGI as a whole. Individual interfaces, data structures and components are described in more detail in subsequent sections.

In this example, the social utility collector 32, is an iTunes® Collector Application 181 that obtains the main source of raw data from the contents of the user's iPhone® backup files 182. These backup files 182 are produced by iTunes® 183 when the user plugs in their iPhone® 184, and are generally in easily decodable formats (See appendix A). The main function of the iTunes® collector application 181 is therefore to scan these backup files 182 for relevant information about the user's 12 communication events, such as calls, SMS messages, and contacts; and to upload the most recent information to the SUGI server 185.

The exemplary embodiment of the system 180 may optionally retrieve location data for a particular user from a location based service, such as AT&T's® FamilyMap™ service 186. This retrieval occurs periodically, and forms part of the main SUGI server.

The exemplary embodiment includes a basic sample application programming interfaces that directly displays the user's social graph 10 using a browser 187 in two formats. A list format 188, ordered by (scalar) closeness of the alters, and a graph format 189, showing an approximation to tie closeness when possible. The application programming interface may be a simple web page that uses the social graph 10 generated by the SUGI system 180.

One of the fundamental problems in automating social network analysis is how to provide a unique identification of the individuals involved. People can change any of the endpoint addresses that are used to reach them (telephone number, email address, etc) and can even change their name, so each of these is theoretically unsuitable as a stable, unique identifier for an individual. If social network analysis includes groups as well as individuals, the same problem arises and is even more difficult, since the group is not a physically distinct object.

In the exemplary embodiment, the fundamental simplifying assumption for identifying egos 12 and alters 16 is that the user can be uniquely identified by their telephone number and address books may further be used to properly identify alters.

To calculate friends-of-friends, a correlation between alters 16 and egos 12 is needed; given an alter B in ego A's direct network, we need to determine whether B is also a subscriber (i.e., another ego). The corrections of friends-of-friends include the following assumptions: (1) The primary email address for an ego 12 is unique and does not change during the study; (2) An alter 16 for subscriber ego A that is identified by an ABPerson entry matches subscriber ego B if B's profile iPhone® number or B's profile email address are present in A's ABPerson entry; and (3) An alter for subscriber ego A that is identified by an endpoint address matches subscriber ego B if profile iPhone® number or B's profile email address match the endpoint address.

In this example, the social utility grid collector may be an iTunes® Collector Application 181 that is capable of scanning backup data 182 on a device 184 having iTunes® software 183, collecting communication data, and then transferring the communication data to the SUGI server 185. SUGI Server central system accumulating participant communication data, processes the data and provides participant access to the resulting social graph 10. Web Application: participant access and collector uploading. Analysis Engine: social graph 10 calculation and tuning.

The example consists of three interacting pieces of software. An iTunes® Collector Application 181, which is a desktop application that scans the user's iPhone® backup data 182 and transfers it to the SUGI server 185. The SUGI Server is the central system that accumulates the users' communication data, processes it and allows the user to access the resulting social graph 10. The last of these may further be split into three distinct pieces.

- The web application that provides data access functionality, both for the other pieces of software and for users of the system
- The analysis engine that performs the calculation and tuning of the social graph 10.
- An additional, optional, data collector that periodically retrieves location data about the user from AT&T's® FamilyMap™ service 186.

The iTunes® Collector Application 181 runs on the user's computer and retrieves data about communication events from their iPhone® backup files. It processes this data to extract the key inputs for the SUGI social graph 10 generation algorithm, and transmits the processed data to the SUGI server 185. This application has the following prerequisites, which are checked for at install time.

- Supported Windows® OS versions: Windows XP®, Windows Vista®, Windows 7®;
- Supported Mac® OS X versions: 10.5 (Leopard®), 10.6 (Snow Leopard®);
- iTunes® v9.0 or above required; and
- Unencrypted backup files from an iPhone® running OS 3.0 or 3.1.

The process of retrieving the communication data will be either triggered periodically, or may be triggered by the USB event indicating that an iPhone® device 184 has been attached to the computer. The classes of communication data that are transmitted are as follows.

- Call information, for voice calls, SMS/MMS messages and voicemails.
- Calendar information, for calendar events that involve multiple attendees.
- Address book information.
- Location information, as deduced from photographs taken on the device.
- Topic information, identifying subjects that the user appears to be interested in.

In each case, metadata about the communication events (time, duration, recipient etc.) is transmitted, but the actual content (text message, voicemail) of the communication is not.

The SUGI server 185 serves as the central repository for the user's communication data, and performs the calculation of the user's social graph 10 (which may potentially indirectly include aspects of other users' data). As such, the SUGI server provides the main user-visible functionality of the SUGI system as a whole.

- Data Access: A web application where the user can view and give feedback on their current social graph 10.
- Collection Control: A part of the web application where the user can enable and disable data collection.

In addition to this user-visible aspect, the SUGI server 185 also includes functionality that is not visible to end users.

- Data Access: The iTunes® collector application 181 accesses the SUGI server 185 to upload the user's communication event data.
- Social graph 10 Generation: The raw data provided by the collector applications is processed into the user's social graph 10; also, feedback from the user about the accuracy of this graph is analyzed for inclusion in future social graph 10 generations.
- FamilyMap™ Collector: An optional data collection piece that periodically retrieves the user's location from the FamilyMap™ service 186.

The main externally-facing part of the SUGI server is a web application 187 that allows both users and other software parts of the SUGI system to access the social graph 10 information.

- Users access this web application to register 191 for the SUGI system, and to provide profile and account information.
- The iTunes® 190 Collector application 181 accesses this web application to upload the raw data about the user's communication events.
- Users access the web application to view their social graph 10, both as a list 188 and potentially as a graph diagram 189.
- Users use the web application to provide feedback on the accuracy of the social graph 10.

Profile Data

Each subscriber to the service provides a set of profile data during the sign-up procedure. This includes the following information, as shown hi FIG. 8, at ref. 130.

- Subscriber identification information. This information is used to uniquely identify the participant.
  - Full name
  - iPhone® telephone number
  - Primary email address
- Contact details. This information includes any information that can be used to correlate this subscriber against another subscriber's communication data. This should effectively cover any information that would appear in someone else's address book to describe this person.
  - Street addresses.
  - Email addresses.
  - Telephone numbers.
  - Instant messaging addresses.
- FamilyMap™ login credentials. This is assumed to be the iPhone® telephone number above together with a website password.
- Demographic Info. This includes the user's home time zone. The demographic information is collected from each end-user and used to perform downstream statistical analysis. Examples of questions for the user to be included in profile data may include the following. "Please indicate if anyone in your household works for the following industries: (a) advertising; (b) communications; (c) construction; (d) sales." "Who provides your cable, internet, and/or telephone service?" "What is your five digit zip code?" "How many people live in your household?" "How many children live in your household?" "Do you rent or own your home?" "What year were you born?" "What is your annual household income?" "How would you describe your ethnicity?" "Are you a male or a female?" "Your employment status may be described as: (a) employed; (b) unemployed; (c) retired; (d) home maker; (d) full-time student."

Raw Data Collected

Examples of the raw data 324 that may be collected by the social utility grid collector 32 and inputted into the social utility grid infrastructure 34. This section describes the categories of raw data 324 that form the input to the SUGI system 30. Appendices A and B describe in detail where and how this raw data is obtained.

Telephone calls, SMS/MMS messages, and voicemails are several different types of call data included as distinct sets of information. Although kept distinct, the information included in each case is similar. The similarities include: (1) unique identifier (rowID) for the information; (2) endpoint address (i.e., telephone number) of alter, in a canonical format; (3) date and time of the communication; (4) direction of the communication (always incoming for voicemails); (5) duration (for telephone calls and voicemails); and (6) message size (for SMS/MMS). Note that call data is immutable once it has been included in the raw data database; hence future synchronization operations do not modify existing rows. See Appendix A for more information on how and where this information is obtained.

Address book data is another type of data that maybe collected by the social utility grid collector 32. The following subsets of information from the user's address book may be stored for each entry: (1) unique identifier for the entry (the rowID from the ABPerson table); (2) entry name; (3) names of groups that the entry is part of; (4) endpoint addresses, such as telephone numbers, email addresses, instant messaging IDs, and a physical address; and (5) a range of date/times that describes the time period of validity for the information for each endpoint address, such as the start date/time is set to the server's current date/time when an endpoint address is first included in a data upload, and the end date/time is set to be just before the current date/time when an endpoint address is removed in a data upload. See Appendix A for more information on how and where this information is obtained.

Calendar data from stored entries may also be collected by the social utility grid collector 32. An example of storied entries may include: (1) event start date and time; (2) event end date and time; (3) location; and (4) attendees. Each event may also be accompanied by a range of date/times that describes the time period of validity for the information. The start date/time is set to the server's current date/time when the event is first included in a data upload. The end date/time is set to be just before the current date/time when the event is removed as part of a data upload. If an event is modified, this is treated as if the previous version of the event has been removed and the new version has been added. See Appendix A for more information on how and where this information is obtained.

Location data may also be collected, when available. Location data may include information relating to: (1) date and time; (2) location; and (3) location accuracy. Location data is treated as immutable once it has been included in the raw data database, hence, future synchronization operations do not modify existing rows. See Appendices A and B for more information on how and where this information is obtained.

A further type of data which may be collected by the social utility grid collector includes topic data related to topics that may be identified as a potentially mutual interest between two or more users. Some examples include: (1) a URL visited together with date of visit; and (2) an iPhone® applications installed, together with a range of date/times that describes the period of validity for the information. The URL data is treated as immutable once it has been included in the raw data database, hence, future synchronization operations do not modify existing rows. See Appendix A for more information on how and where this information is obtained.

Moreover, data may be excluded by the user 12. For example, the user may explicitly specify that data should not be recorded during a particular interval. The intervals are stored as part of the raw data database and are used to filter out other types of raw data.

The raw data may be used as input for runs of the social graph 10 generation algorithm. Each of these runs is described by a set of data that includes all the information that would be needed to exactly repeat that run and its results, including the date and time that the run was originally performed. See (FIG. 8, ref. no. 170, 172, 174, 176).

The input data corresponding to each run may include the following. The ego 12 and alter 16 pair involved in the run. Indication of the exact set of raw data that was included in the run's calculations, i.e., for data types where historical data is immutable (such as call logs), this is encoded as a maximum row ID from the raw data; for address book or calendar data, this is encoded as a date/time, only data whose range of validity encompasses this date/time is included; and if the alter is also a participant in the study (i.e., is another ego), then the set of raw data is made of two sets of data—the ego's 12 and the alter's 16 because some of the calculations (e.g., proximity) use both. The set of parameters that were used in the calculation, such as explicit normalization factors and delay function parameters. The subversion revision identifier for the model code that was used to produce the run.

The output data corresponding to the run may include the multi-dimensional closeness vector between the ego 12 and the alter 16 and the scalar distance between the ego 12 and the alter 16.

In operation, the system may be configured to delete any run if the underlying raw data is deleted. This mostly applies within the context of a particular ego 12; however, there are some aspects of the social graph 10 calculation that use raw data from another ego 12. Proximity calculations may be based on the raw location data from two egos 12. Topic-based calculations may be based on the interaction of multiple egos 12 with the topic. In such cases, removal of ego A's raw data may induce the removal of ego B's run data.

Manipulation of Data

The key operation of the social utility grid collector 32 is to upload the user's data to the server. This section describes how this operation is triggered. There are two possible approaches.

Ideally, the collector 32 should be triggered by a USB connection event that indicates that an electronic communication device 44 has been connected to the computer. After a suitable delay to allow the backup to occur, the upload functionality can be triggered.

As a fallback position, the Collector 32 can be installed in a manner so that it automatically runs at start-of-day when the computer boots. It can then periodically poll (say every 30 minutes) for the existence of new backup data.

For example, data that may be uploaded by an iTunes® collector is provided below. This data is retrieved from the iTunes® backup files described in appendix A, is reduced to the specifically desired fields and is encoded in the API format.

Telephone calls: from HomeDomain::Library/CallHistory/call_history.db include data.rowid, data.address, data.date, data.duration, (data.flags & 0x01), Voicemails: from HomeDomain::Library/Voicemail/voicemail.db include voicemail.rowid, voicemail.sender, voicemail.date, voicemail.duration, (direction is incoming).

SMS/MMS messages: from HomeDomain::Library/SMS/sms.db include message.rowid, either telephone numbers extracted from message.recipients or from message.address, message.date, sizeof(message.text), (message.flags & 0x01) together with:

SMS messages: strlen(message.text);

MMS messages: strlen(msg_pieces.data)+filesize(msg_pieces.content_loc) (for entries where msg_pieces.message_id=message.rowid).

Address book: from
HomeDomain::Library/AddressBook/Addressbook.sqlitedb include
ABPerson.rowid, ABPerson.First, ABPerson.Middle, ABPerson.Last,
ABPerson.DisplayName together with
ABMultiValue.property and ABMultiValue.value values
ABMultiValue.record_id=ABPerson.rowid, plus
ABMultiValueEntry.value where
ABMultiValueEntry.parent_id=ABMultiValue.rowid.

Calendar: from HomeDomain::Library/Calendar/Calendar.sqlitedb include Event.start_date, Event.start_tz, Event.end_date, Event.location information when either Event.location is nonempty or when there are corresponding entries in the Attendee table (i.e., that have Attendee.event_id=Event.rowid); also include Participant.email for rows in the Participant table identified by Attendee.participant_id.

Photo Location: for any iPhone® GPS-tagged photographs, include Exif.DateTimeOriginal, Gps.LatituteRef, Gps.Latitude, Gps.LongitudeRef, Gps.Longitude.

URL Visited: from HomeDomain::Library/Safari/History.plist include WebHistoryDates.<blank> and WebHistoryDates.lastVisitedDate.

Apps Installed: from Manifest.plist, include the set of keys from the Applications entry.

Examples of the data stored by the iTunes® collector application include:

Account data: For each iPhone®, the email address and (obscured) password for the corresponding account are stored.

Status data: For each account, the following information is stored.

Date of last successful upload

Date of last backup examined

Whether the user has indicated that they don't want to confirm upload is allowed.

Whether current login credentials have explicitly failed at login.

Upload data: Files containing raw data that has been prepared for upload, but which have not yet been uploaded, are stored. Note that there may be multiple files (ordered by date) for a particular account, to cope with the situation where multiple backups have occurred during a period when the server was inaccessible.

Raw data status: Information is stored to allow the generation of upload data to identify exactly which pieces of data have changed since the last generation. This includes highest-seen row IDs for those sets of information that are strictly incremental (e.g., call logs), plus copies of entire sets of information where more detail is needed (e.g., address book entries).

The operations that the application performs in order to transmit SUGI data from the user's computer to the SUGI server is provided below. In general, the operations described herein are repeated across all of the electronic communication devices involved; that is, they run: (1) for each accessible user account (which may depend on the manner in which the application was installed); and (2) for each electronic communication device that has appeared under that user account.

The following checks are performed before any data synchronization is performed.

If the collector is disabled, exit.

If the backup date for the electronic communication device is unchanged, exit. (If the collector application has been triggered by a USB connection event, a short timer should be used for retrying the operation, since it is likely that backup is still in progress.)

In order to prepare the latest data for upload, the application performs the following steps to generate a file which contains the latest communication data, and which is suitable for upload to the server.

Extract all records from the call databases (calls, voicemails, SMS/MMS messages) that have a rowID higher than that seen previously. Update the record of the highest rowID seen in the call databases.

Compare each record in the address book with the previously seen version, generating the following.

New value of the entry name.

Add and delete actions for each changed endpoint address.

Update the cache of the previous state of the address book.

Update the record of the highest rowID seen in the call databases.

Compare each record in the calendar with the previously seen version, generating the following for new or changed events.

Event start/end date/time

Location

Attendees

Update the cache of the previous state of the calendar.

Iterate over all data that have not been, seen previously, generating date/time and location data.

Update the record of the most recent data observed.

Extract all URL records that are more recent than the last upload data generation.

Compare the list of applications installed against the previously uploaded list. If different, upload and update the list.

Before a server data upload operation can begin, the following checks are made.

If there are no prepared data upload files available, exit.

If there is no current internet connection available, exit.

If the user has not previously selected the "Don't show this again" checkbox, show the upload confirmation dialog. This includes the following.

An "OK" button; if selected, data upload is attempted immediately.

A "Later" button; if selected, exit (and retry at a later timer pop iteration).

A "Don't show this again" checkbox which prevents the dialog from ever being shown again.

The server data upload operation uses an SSL connection to the server 38, which is also secured with the user authentication credentials associated with the account. Once this connection is established, each of the prepared data upload files is sent to the server. Once a file has been successfully sent, it is removed and the date of last successful upload is updated. If the login credentials fail, then the corresponding account details are marked as explicitly known bad.

Social Graph

The social graph 10 is the fundamental output of the system 30. It is embedded in the run data: the current social graph 10 for a particular ego 12 is retrieved from this table by selecting rows from the run table with the given ego 12 and with the most recent date/time of run. The scalar and multi-dimensional distances between each ego 12 and alter 16 are also included in the social graph 10 information.

For example, the iTunes® Collector runs on the user's computer and uploads communications data to the main server. This is the high level design for the iTunes® Collector component and it is assumed that using USB connection events to trigger data upload is beyond the scope of the embodiment.

Altering the Social Graph

Once an initial social graph 10 is generated, the user may explicitly indicate that the inferences included in the social graph 10 are inaccurate. This preference data is stored as follows: (1) the ego ID that specified a preference; (2) the alter 16 that they specified a preference about; (3) date and time that the user indicated their preference; (4) identifier for the run that was used as the base display data; this identifies what the user made changes to; and (5) the user-suggested scalar distance between the ego 12 and alter 16.

Account Management

In the previous example, the iTunes® collector application supports multiple iPhones® that synchronize to a single computer. This is accomplished by allowing multiple SUGI user accounts, each of which corresponds to a particular iPhone® that synchronizes with this computer. The main account management window shows a list of the iPhones® that have backups on the local computer, under the currently logged in user. There are no options to add or remove entries from this list, as it is generated from the available iPhone® backup data. The following columns are displayed in the list.

Configured?: This column holds an icon that indicates the SUGI configuration status of this iPhone®. Possible values are as follows.
  Blank: no SUGI account information has been configured.
  Checkmark: SUGI account information has been configured, and is not known incorrect.
  Question mark: SUGI account information has been configured, but login has failed with these details.
Name: Shows the name associated with the iPhone® (taken from the Display Name field in Info.plist).
Number: Shows the telephone number associated with the iPhone® (taken from the SBFormattedPhoneNumber field in HomeDomain::Library/Preferences/.GlobalPreferences.plist).
Last upload date: Shows the date that information from this iPhone® was last successfully uploaded to the SUGI server.

Next to this list is a Cancel button and a "Configure . . . " button (which is grayed out when no entry in the list is selected), which launches the account configuration window for the selected iPhone®.

The account configuration window is a modal dialog that holds the following items.
  A non-editable display of the name associated with the iPhone® (e.g., "iPhone® Name: DMDWork").
  A non-editable display of the telephone number associated with the iPhone® (e.g., "iPhone® Number: +44 20 8366 1177").
  An editable text field where the user enters the email address that is associated with the phone's account at the SUGI server (e.g., "SUGI Account Email: david.drysdale@metaswitch.com").
  An editable text field where the user enters the corresponding password, which is not displayed as clear text (e.g., "SUGI Account Password: *******").
  Save and Cancel buttons.

When the user triggers the Save button, the following actions are performed.
  If the email address is blank or not a valid email address, a warning dialog is displayed and control returns to the account configuration window.
  If the password is blank, a warning dialog is displayed and control returns to the account configuration window.
  An attempt is made to log in to the SUGI server using the details provided (iPhone® number, email address, password).
  If the login succeeds, or if the server is inaccessible, the account details are saved and control returns to the account management window.
  If the login fails, a warning dialog is displayed and control returns to the account configuration window.

The main user-accessible interface to the iTunes® collector application may be:
  Windows®: an icon in the notification area (commonly known as the system tray), typically in the lower-right corner of the screen.
  Mac® OS X: a menu extra that appears on the right of the menu bar.
In either case, triggering the menu shows the following options.
  Visit SUGI Website: Launches the user's browser at the main SUGI URL.
  Data Upload Enabled: Toggles a checkmark that indicates whether upload functionality is enabled or disabled.
  Force Upload: Forces an immediate attempt to upload SUGI data (rather than waiting until a timer expires). Grayed out if no upload data is pending for any iPhone® associated with the current user.
  Configure . . . : Launches the profile management window.
  Help: Displays help information in the user's browser.
  Exit: Terminates the application (it will restart on next reboot).

In addition to this main interface, the user can interact with the application in the following additional ways.
  Windows®: The installer adds a new section to the Programs menu, which holds the following entries:
    Collector: Restarts the application if it has been terminated (or silently completes if the application is already running); and
    Uninstall: Triggers uninstall of the application.
  Windows®: The application can be uninstalled from the list in Control Panel/Add or Remove Programs.
  Mac® OS X: The application's bundle is visible in the Applications folder, and can be uninstalled by dragging it to the Trash.

Windows®/Mac® OS X Variations

The iTunes® collector application may be implemented in manner that allows for the greatest possible commonality of code between Windows® and Mac® OS X.
  Core data processing functionality will be separated from user interface elements, and pure user interface code will be separated from common control code.
  Common formats will be used for internal data storage.
  Portable libraries (e.g., OpenSSL) will be used for underlying functionality where possible.
  Code will be implemented in a language that is available on both platforms.

However, there are still a number of areas that will need to be implemented independently on Windows® and Mac® OS X.
  Installation and uninstallation mechanisms.

USB connection event registration.

Registering the application to be automatically started at boot time.

Timer callback registration.

Determining current user information and iPhone® backup location.

User interface elements.

For example, AT&T's® FamilyMap™ service allows users to track the location of registered cell phones. The FamilyMap™ Collector component of the SUGI system 30 uses this service to provide location data for SUGI subscribers. The overall approach of this collector component is as follows.

The user optionally records their FamilyMap™ credentials as part of their profile on the system.

The FamilyMap™ Collector periodically logs in to the FamilyMap™ system using these credentials, and triggers a location operation on the subscriber's iPhone®.

The available location data at FamilyMap™ is retrieved and stored as raw data for future social graph 10 generation operations.

The user's profile page 130 on the main SUGI server 185 may also allow the user to enter and edit their login details for the FamilyMap™ service, such as:

a warning to the user that providing their credentials indicates that they allow the SUGI service to access data about their location;

a warning that generating the location data might potentially increase the battery use on their phone; and an indication of whether the login credentials currently held by the system are known to be incorrect.

When these credentials are added or modified, a login operation is attempted by the SUGI server. If this login fails due to incorrect credentials, the page is redisplayed, including the error message described above. The user's FamilyMap™ password information is stored in the main profile database, but is stored in an obscured non-plain text form.

Location data retrieval is attempted periodically for all subscribers who have provided FamilyMap™ credentials. The polling period is set to 30 minutes during the day, and 3 hours during the night (0:00-6:00), in the home time zone associated with the user's profile.

When triggered, the data retrieval process for a user proceeds as follows.

The SUGI server logs in to the FamilyMap™ server using the credentials provided. The server verifies that this login process occurs over an SSL session.

If this fails because of authentication failure, the credentials are marked as known-invalid, and the user is sent an email indicating that location data collection is suspended (together with a reminder that if they have changed their password, they need to update it on the SUGI site too).

If the login fails (whether due to authentication failure or for any other reason), the data retrieval process is abandoned.

The existing location data for the relevant phone is retrieved from the site by web scraping, using the page structure information described in appendix B.2. This involves navigating to the History tab and to the current date, then examining the top entry in the list.

If the most recent location data is not already present in the raw data database, it is added (unless it overlaps with a time interval when the user explicitly specified that data collection was to be disabled).

If existing location data is sufficiently recent that a new location operation is not needed, retrieval process is complete. (This may be the case if the user has already set up a regular schedule of location retrievals on the FamilyMap™ website itself.)

If the user has currently explicitly specified that data collection should be disabled, the retrieval process is complete.

The "Locate" button action from the "My Family" is triggered, and the data retrieval operation is scheduled to be repeated after a short interval (2 minutes).

If the data retrieval operation still fails to find recent location data even after the Locate function has been used, the retrieval process is abandoned.

Install & Uninstall of Software Associated with the System

At install time, the installer for the application checks the following prerequisites.

A supported operating system is present—Windows XP®, Windows Vista®, Windows 7®, Mac® OS X 10.5 (Leopard®), Mac® OS X 10.6 (Snow Leopard®).

A supported version of iTunes® is installed (9.0 and above).

The PC has an unencrypted backup of an iPhone®, and the iPhone® has a supported version of the operating system.

No other prerequisites are required; in particular, the installer does not need any other software to already be installed on the computer. If any of the prerequisites above are missing, the installer exits and warns the user, ideally about all of the missing prerequisites, not just the first one encountered. The installer may potentially be run for a single user, or for all users (if the user has administrative privileges). This affects which accounts are accessible to the application.

After install, the installer registers the application for whichever method of triggering uploads is in use, either USB trigger events or to be run at start-of-day. Once the application has been installed, the Social Utility Grid collector 32 program is launched and its profile management functionality is automatically triggered.

On uninstall, the uninstaller checks the user accounts that have been configured, and warns the user that potentially multiple accounts will become inaccessible after uninstall. If the user agrees to continue, the application and all associated data are removed.

The Computer System

Figure 20:
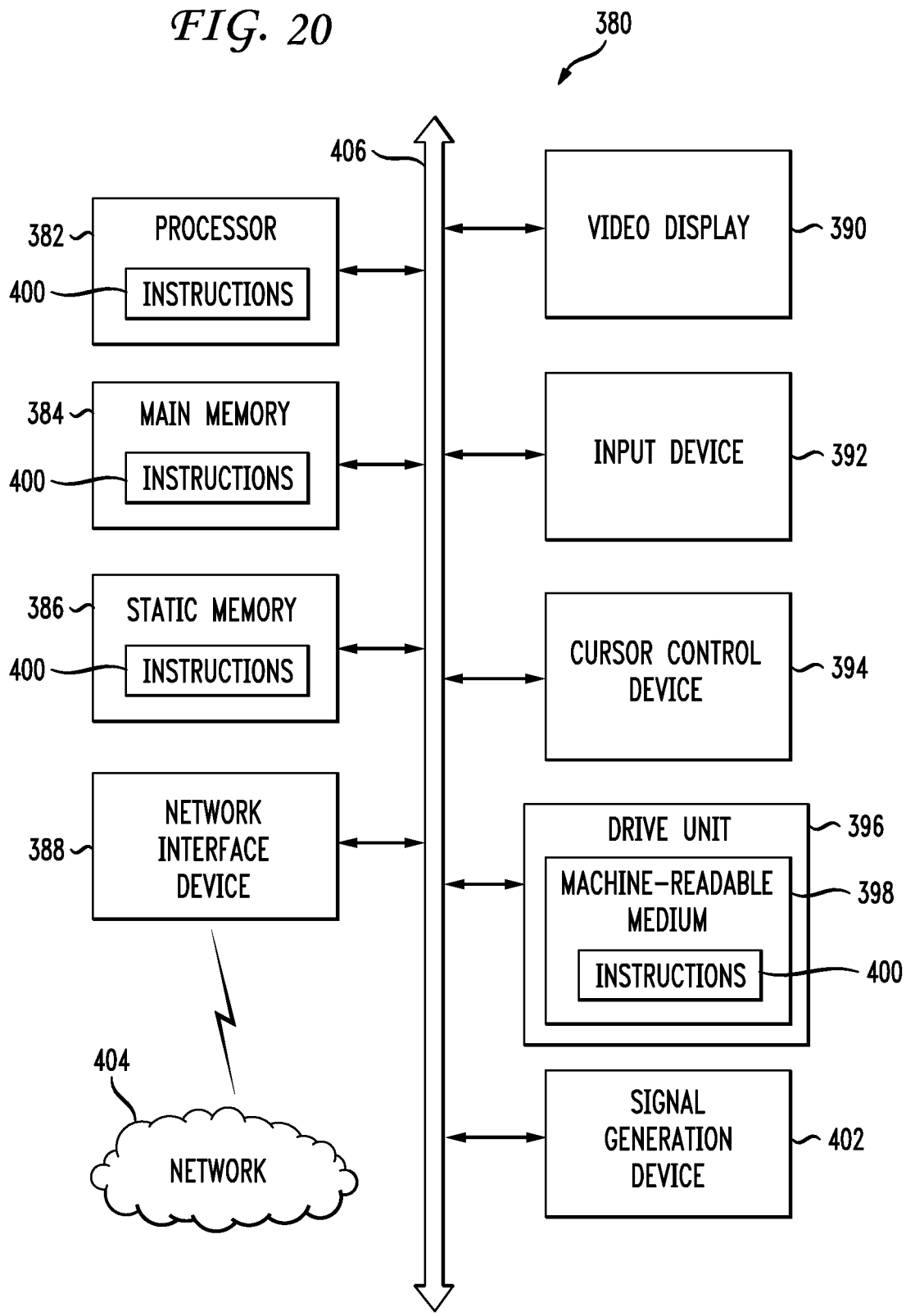
FIG. 20 shows a computer system configured to perform one or more methods disclosed herein.

The proposed mechanism for calculating social relationships and generating a social graph 10 is compatible with any number of electronic communication devices and computing devices, including servers, personal computers, portable wireless devices (such as smart phones), and/or electronic devices having similar functionality, as will be appreciated by those skilled in the art. FIG. 20 is a block diagram of a general computer system 380. The computer system 380 can include a set of instructions that can be executed to cause the computer system 380 to perform any one or more of the methods or computer based functions disclosed herein. The computer system 380, or any portion thereof, may operate as a standalone device or may be connected, e.g., using a network 404, to other computer systems or devices disclosed herein. For example, the computer system 380 may include or be included within any one or more of the systems, networks, hosts, routers, servers, proxy devices, or any other devices disclosed herein.

In a networked deployment, the computer system 380 may operate in the capacity of a server or a client machine in a server-client network environment, or a peer machine in a peer-to-peer (or distributed) network environment. The computer system 380 can also be implemented as or incorporated into various devices, such as a personal computer (PC), a tablet PC, a personal digital assistant (PDA), a web appliance, a communications device, a mobile device, a wireless telephone, a control system, a network router, switch or bridge, or any other machine capable of executing a set of instructions (sequential or otherwise) that specify actions to be taken by that machine. Further, while a single computer system 380 is illustrated, the term "system" shall also be taken to include any collection of systems or sub-systems that individually or jointly execute a set, or multiple sets, of instructions to perform one or more computer functions.

As illustrated in FIG. 20, the computer system 380 may include a processor 382, e.g., a central processing unit (CPU), a graphics-processing unit (GPU), or both. Moreover, the computer system 380 can include a main memory 384 and a static memory 386 that can communicate with each other via a bus 406. As shown, the computer system 380 may further include a video display unit 390, such as a liquid crystal display (LCD), an organic light emitting diode (OLED), a flat panel display, a solid state display, or a cathode ray tube (CRT). Additionally, the computer system 380 may include an input device 392, such as a keyboard, and a cursor control device 394, such as a mouse. The computer system 380 can also include a disk drive unit 396, a signal generation device 402, such as a speaker or remote control, and a network interface device 388.

In a particular embodiment, as depicted in FIG. 20, the disk drive unit 396 may include a machine or computer-readable medium 398 in which one or more sets of instructions 400 (e.g., software) can be embedded. Further, the instructions 400 may embody one or more of the methods or logic as described herein with reference to FIGS. 1-19. In a particular embodiment, the instructions 400 may reside completely, or at least partially, within the main memory 389, the static memory 386, and/or within the processor 382 during execution by the computer system 380. The main memory 384 and the processor 382 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein may be stored.

CONCLUSION

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

Thus, a method, system, and computer-readable medium for calculating a social graph 10 using a social utility grid interface have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

What is claimed is:

1. A method for calculating social relationships and generating a social graph comprising:
    collecting one or more types of communication data;
    inputting the one or more types of communication data into a social utility grid infrastructure, the social utility grid infrastructure analyzes the input data to determine a multi-dimensional first-order social graph by performing operations comprising:
    normalizing each of the one or more types of communication data by calculating a closeness value for the each of the one or more types of communication data for a particular ego and alter ego pair, the closeness value based on a normalization factor assigned to the each of the one or more types of communication data, a relationship decay function, temporal information, and an importance factor;
    representing the each of the one or more types of communication data as a vector in a multi-dimensional vector from the ego to the alter ego in the particular ego and alter ego pair using the closeness value of the each of the one or more types of communication data;
    calculating a Euclidean Norm using the closeness values for the each of the one or more types of communication data, where the Euclidean Norm provides a scalar representation of the closeness for each of the one or more types of communication data; and
    generating the multi-dimensional first-order social graph; and
    providing the multi-dimensional first-order social graph to one or more software applications.

2. The method of claim 1, wherein the one or more types of the communication data normalized includes one or more of the following selected from the group consisting of: call data, address book data, proximity data, topic data, and email data.

3. The method of claim 1, wherein the closeness value is calculated to include a relationship decay function, the relationship decay function is based on one or more of the following types of equations selected from the group consisting of a step equation, a piecewise linear equation, an exponential equation, a power equation, and a sigmoid equation.

4. The method of claim 1, further comprising displaying one or more elements of the multi-dimensional social graph on a user interface.

5. The method of claim 4, further comprising accepting user entry of a desired closeness for the particular ego and alter ego pair.

6. The method of claim 1, further comprising providing a supervisory override function such that the input data for the particular ego and alter ego pair is ignored and a user is capable of explicitly marking a particular relationship with a designation irregardless of the closeness value.

7. The method of claim 1, further comprising generating a multi-dimensional second-order social graph based on the closeness of the particular ego and alter ego pair and all alter egos of the ego's alter ego.

8. The method of claim 1, wherein the multi-dimensional first-order social graph is provided to the one or more software applications based on user preferences, access constraints, and privacy policies.

9. A system for calculating social relationships and generating a social graph comprising:
    a social utility grid collector configured to gather one or more types of communication data;
    a social utility grid infrastructure configured to analyze the one or more types of communication data;
    a social utility grid application configured to provide a user interface capable of accepting user input and displaying the social graph; and
    a server, wherein the server comprises a hardware processing device and a three-tiered web application configured to operatively connect the social utility grid infrastructure to the social utility grid application;
    wherein the system generates a multi-dimensional first-order social graph by performing operations comprising:
    collecting one or more types of communication data using the social utility grid collector;
    inputting the one or more types of communication data into the social utility grid infrastructure, the social utility grid infrastructure analyzes the input data to determine the multidimensional first-order social graph by performing operations comprising:
    normalizing each of the one or more types of communication data by calculating a closeness value for the each of the one or more types of communication data for a particular ego and alter ego pair, the closeness value based on a normalization factor assigned to the each of the one or more types of communication data, a relationship decay function, temporal information, and an importance factor;
    using the closeness value of the each of the one or more types of communication data to represent the each of the one or more types of communication data as a vector in a multi-dimensional vector from the ego to the alter ego in the particular ego and alter ego pair;

calculating a Euclidean Norm using the closeness values for the each of the one or more types of communication data, where the Euclidean Norm provides a scalar representation of the closeness for each of the one or more types of communication data; and generating the multi-dimensional first-order social graph; and providing the multi-dimensional first-order social graph to the social utility grid application via the server, wherein the social utility grid application displays one or more elements of the multi-dimensional first-order social graph on the user interface.

10. The system of claim 9, wherein the social utility grid application is web based.

11. The system of claim 9, wherein the multi-dimensional first-order social graph is provided to the social utility application based on user preferences, access constraints, and privacy policies.

12. The system of claim 9, wherein the one or more types of the communication data normalized includes one or more of the following selected from the group consisting of: call data, address book data, proximity data, topic data, and email data.

13. The system of claim 9, wherein the closeness value is calculated to include a relationship decay function, the relationship decay function is based on one or more of the following types of equations selected from the group consisting of a step equation, a piecewise linear equation, an exponential equation, a power equation, and a sigmoid equation.

14. The system of claim 9, wherein the social utility grid infrastructure accepts user entry of a desired closeness for the particular ego and alter ego pair.

15. The system of claim 9, wherein the social utility grid infrastructure includes a supervisory override function such that the input data for the particular ego and alter ego pair is ignored and a user is capable of explicitly marking a particular relationship with a designation irregardless of the closeness value.

16. The system of claim 9, wherein a multi-dimensional second-order social graph is generated by calculating a second order relationship value based on the closeness value of the particular ego and alter ego pair and the closeness value between all alter egos of the ego's alter ego.

17. An article of manufacture storing instructions that, when executed by a processing device, cause the processing device to calculate social relationships and generate a social graph by performing operations comprising:

collecting one or more types of communication data;

inputting the one or more types of communication data into a social utility grid infrastructure, the social utility grid infrastructure analyzes the input data to determine a multidimensional first-order social graph by performing operations comprising:

normalizing each of the one or more types of communication data by calculating a closeness value for the each of the one or more types of communication data for a particular ego and alter ego pair, the closeness value based on a normalization factor assigned to the each of the one or more types of communication data, a relationship decay function, temporal information, and an importance factor;

representing the each of the one or more types of communication data as a vector in a multi-dimensional vector from the ego to the alter ego in the particular ego and alter ego pair using the closeness value of the each of the one or more types of communication data;

calculating a Euclidean Norm using the closeness values for the each of the one or more types of communication data, where the Euclidean Norm provides a scalar representation of the closeness for each of the one or more types of communication data; and generating the multi-dimensional first-order social graph; and providing the multi-dimensional first-order social graph to one or more software applications.

18. The article of manufacture of claim 17, wherein the one or more types of the communication data normalized includes one or more of the following selected from the group consisting of: call data, address book data, proximity data, topic data, and email data.

19. The article of manufacture of claim 17, wherein the closeness value is calculated to include a relationship decay function, the relationship decay function is based on one or more of the following types of equations selected from the group consisting of a step equation, a piecewise linear equation, an exponential equation, a power equation, and a sigmoid equation.

20. The article of manufacture claim 17, further comprising displaying one or more elements of the multi-dimensional social graph on a user interface.

* * * * *